United States Patent
Itami et al.

(10) Patent No.: US 6,278,984 B1
(45) Date of Patent: Aug. 21, 2001

(54) SOFTWARE PROCESSING APPARATUS WRITING SOFTWARE TO A MEDIUM ONLY IF IDENTIFICATION INFORMATION IN THE SOFTWARE CORRESPONDS TO IDENTIFICATION INFORMATION IN THE MEDIUM

(75) Inventors: Satoshi Itami; Kazuo Nakashima; Kenichi Utsumi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 936 days.

(21) Appl. No.: 08/507,981

(22) Filed: Jul. 27, 1995

(30) Foreign Application Priority Data

Sep. 9, 1994 (JP) .................................................. 6-216451

(51) Int. Cl.[7] .............................. G06F 17/60; H04K 1/00; H04L 9/00
(52) U.S. Cl. .................................. 705/57; 705/51; 710/36
(58) Field of Search .............................. 380/4; 371/51.1; 364/401; 395/712; 705/57, 51; 710/36

(56) References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |

(List continued on next page.)

FOREIGN PATENT DOCUMENTS

| | | |
|---|---|---|
| 62-205572 | 9/1987 | (JP) . |
| 63-289660 | 11/1988 | (JP) . |

OTHER PUBLICATIONS

"IEBCOPY" by IBM, Jan. 18, 1993, pp. 1–6.*
"DSMSERV DUMPDB" by IBM, 1993, pp. 1–6.*
Japanese Patent Laid–Open Publication No. 57–127249, Aug. 7, 1982 (equivalent to Japanese Patent Publication No. 61–22815).
Japanese Patent Laid–Open Publication No. 5–89363, Apr. 9, 1993.
Japanese Patent Laid–Open Publication No. 5–266575, Oct. 15, 1993.
Japanese Patent Laid–Open Publication No. 5–298085, Nov. 12, 1993.
Japanese Patent Laid–Open Publication No. 6–95871, Apr. 8, 1994.

*Primary Examiner*—Le Hien Luu
(74) *Attorney, Agent, or Firm*—Staas & Halsey LLC

(57) ABSTRACT

A vendor ID is written to a system area of a write-once optical disk. When the write-once optical disk is loaded onto a write-once disk drive, a control CPU reads the vendor ID. The vendor ID is written into the header of software received through an interface unit. When the software is input to an SD circuit, the control CPU reads the vendor ID. The control CPU compares the vendor ID in the system area of the write-once optical disk with the vendor ID of the header of the software and checks whether or not the two IDs are identical. If the two IDs correspond to each other, the control CPU writes the software to the write-once optical disk.

10 Claims, 14 Drawing Sheets

U.S. PATENT DOCUMENTS

| | | |
|---|---|---|
| 4,864,516 | 9/1989 | Gaither et al. . |
| 4,879,645 | 11/1989 | Tamada et al. . |
| 4,949,257 * | 8/1990 | Orbach . |
| 4,965,802 * | 10/1990 | Shinagawa ............................ 371/51.1 |
| 4,999,806 * | 3/1991 | Chernow et al. . |
| 5,006,849 * | 4/1991 | Baarman et al. . |
| 5,008,814 * | 4/1991 | Mathur . |
| 5,014,234 * | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |
| 5,162,989 * | 11/1992 | Matsuda ................................. 364/401 |
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |
| 5,388,211 * | 2/1995 | Hornbuckle ............................ 395/712 |
| 5,412,718 * | 5/1995 | Narasimhalu et al. ................... 380/4 |
| 5,418,852 * | 5/1995 | Itami et al. ................................ 380/4 |
| 5,555,304 * | 9/1996 | Hasebe et al. ............................ 380/4 |
| 5,598,470 * | 1/1997 | Cooper et al. ............................ 380/4 |

* cited by examiner

SOFTWARE PROCESSING APPARATUS WRITING SOFTWARE TO A MEDIUM ONLY IF IDENTIFICATION INFORMATION IN THE SOFTWARE CORRESPONDS TO IDENTIFICATION INFORMATION IN THE MEDIUM

BACKGROUND OF THE INVENTION

1. Field of the Invention

The present invention relates to a software processing apparatus employed for a software distribution system for delivering software such as a computer programs or a video work, etc. and particularly digitized software.

2. Description of the Prior Art

A software is desired to be distributed because of its value. While on the other hand, the software is intangible so that the software can not therefore exist solely in a physical sense. Hence, when distributing the software, the software is fixed to a medium which is a transferrable movable property. For example, a computer program is sold while being fixed to a floppy disk. Further, a video work is sold while being fixed to a video tape, a silver film, etc.. Also, a music work is sold while being fixed to a compact disk, a record and an audio tape.

However, when the software is put on the market while being fixed to the medium, the distribution of the software is largely influenced by a characteristic of the medium absolutely in the same way with other corporeal things. That is, a distribution quantity of the software is limited to the number of mediums to which sets of copied software are fixed. Further, a content (which herein implies the software) of the medium can not be easily changed.

Consequently, there may be such a situation that the mediums fixed with a certain set of software were sold out, while a stock of mediums fixed with other sets of software could not be sold out. Because of producing this situation, vendors for vending plural kinds of software have to predict the sales and deal with a complicated stock management such as knowing what sets of software to be manufactured (i.e., knowing what sets of software to be copied and fixed them to the mediums). Besides, if this sales prediction is out of a target, they may encounter a large loss in some cases. This situation is conceived as an adverse effect caused by transforming the software originally defined as the intangible into the corporeal thing by fixing it to the medium. This is, it can be said, a situation of spoiling an advantage inherent in the intangible wherein an arbitrary number of copies are produced.

By the way, those sets of software may be broadcasted in the form of TV broadcasting, radio broadcasting and cable broadcasting. If the software becomes an object for such broadcasting, a software running royalty for the broadcast itself of the software is paid from a broadcasting enterpriser to a software rightful claimant (a claimant for copyright). For this reason, audiences are allowed to watch and hear the software with no charge. Part of the running royalty for (the right of broadcasting of) the software to be paid by the broadcasting enterpriser may be burdened on the audience as a broadcasting license fee in some cases. Further, in a video broadcasting system based on an on-demand method, the software running royalty itself is imposed on the audience.

However, even in the case that the broadcasted software is allowed to be watched and heard with no charge, once the broadcasted software is fixed to the medium, as a matter of fact, the software can be reproduced plural number of times, or, the software can be transferred to a third party. Such a way of using the software brings about a unprofitability to the software rightful claimant (the claimant for copyright) that can not be covered simply by collecting the broadcasting license fees. Accordingly, if the audience fixes the broadcasted software onto the medium, the audience should give the software rightful claimant (claimant for copyright) a profit of the same amount of money as that in the case of vending a copy of the software while being fixed to the medium. Especially in the case that the software consists of digitized data, absolutely the same copy as the original can be obtained from such characteristics of the digitized data that copying on other mediums is extremely easy, and there is no deterioration due to the copying as seen in the analog information. Hence, there is an extremely high possibility in which the copying conduct spoils the profit of the claimant. Under such circumstances, there has hitherto been utilized a system wherein a software running royalty is previously added to a sales price of the medium.

Even if the medium is vended in the manner of added the software running royalty beforehand to the sales price thereof, however, the medium itself can be fixed with any kinds of software (including not only those from which the copyrights are derived but also natural creatures themselves). Accordingly, at the point of time when vending this medium, the vendor can not previously know which software will be fixed to which medium. Hence, even if a specific set of software is fixed to a certain medium afterward, it is difficult to pay the running royalty added beforehand to the sales price of that medium back to the software rightful claimant. Further, if a video and sounds of a natural creature are fixed onto the medium, or if the software copyrighted by the medium user himself or herself is fixed onto this medium, the running royalty added beforehand to the sales price of the medium becomes, as a matter of fact, an illegal profit.

SUMMARY OF THE INVENTION

It is a first object of the present invention, which was devised in view of a problem inherent in distributing the above software while being fixed to a medium, to provide a software processing apparatus suited to a software distribution system that is capable of distributing a software separated from a medium and surely collecting a sales price (running royalty) of a copy of the software.

It is a second object of the present invention, which was devised in view of a problem inherent in the case of previously adding a running royalty to a sales price of the above-described medium, to provide a software processing apparatus suited to a software distribution system that is capable of previously restricting software which can be fixed onto a certain medium and therefore surely paying a software running royalty added to a sales price of the medium back to a rightful claimant of the software.

The software processing apparatus according to the present invention takes the following constructions in order to obviate the first and second problems given above.

According to a first construction of the software processing apparatus of the present invention, the apparatus comprises a first information reading section for reading a first identification information stored on a medium and a second information reading section for reading a second identification information contained in software. The apparatus also comprises a comparing section for comparing the first identification information read by the first information reading section with the second identification information read by the second information reading section and a software writing section for writing the software to the medium only when the comparing section recognizes that the first identification information corresponds to the second identification information.

Further, according to a second construction of the software processing apparatus of the present invention, the apparatus comprises a first information reading section for reading a first identification information stored on a medium and a second information reading section for reading a second identification information from the medium when the software and the second identification information contained in this software are written to the medium. The apparatus also comprises a comparing section for comparing the first identification information read by the first information reading section with the second identification information read by the second information reading section and a software reading section for reading the software from the medium only when the comparing section recognizes that the first identification information corresponds to the second identification information.

Additionally, according to a combination of the first and second constructions of the software processing apparatus of the present invention, the apparatus comprises a first information reading section for reading a first identification information stored on a medium, a second information reading section for reading a second item of identification information contained in software and a first comparing section for comparing the first identification information read by the first information reading section with the second identification information read by the second reading section. The apparatus also comprises a software writing section for writing the software and the second identification information to the medium only when the first comparing section recognizes that the first identification information corresponds to the second identification information and a third information reading section for reading the second identification information from the medium when the software and the second identification information are written to the medium. The apparatus further comprises a second comparing section for comparing the first identification information read by the first information reading section with the second identification information read by the third information reading section and a software reading section for reading the software from the medium only when the second comparing section recognizes that the first identification information corresponds to the second identification information.

The medium may be vended in such a way that the running royalty of the software scheduled to be written is previously added to a sales price thereof.

This medium is a memory to which the software can be written. Hence, the medium may be a semiconductor memory or a magnetic storage medium. Further, an writable optical disk may also be usable. In this case, the medium can be constructed such that the software is once writable thereto. If the medium is thus constructed, and when the software is written to all storage areas, the software can not be written any more. Accordingly, since the number of sets of software that are to be written to the disk can be specified beforehand, the software running royalty corresponding to this medium is easy to be determined. A write-once optical disk may exemplify this only-once writable medium. Further, a magneto-optic disk may be employed as the medium. In this case, the software can be written to the medium plural number of times. However, there is no problem if a section for restricting the number of writing processes is added.

An ID code of a software rightful claimant may be used as an item of identification information. The identification information may include a code for specifying some of the software among the plural set of the software of which claimant is same. The identification information may further include a code for specifying a group consisting of a plurality of software rightful claimants.

Also, the first identification information may be so constructed as to be written to a specified area on the medium. In this case, the first information reading section may be constructed to read the first identification information only when the first identification information is written to the specified area on the medium. When constructed in this way, and even if the user additionally writes the identification information to an area exclusive of this specified area after vending the medium, the first information reading section can ignore this. As a result, only the identification information written to the specified area on the medium under monitoring by the software rightful claimant before vending the medium is checked by the first information reading section, and hence a software using quantity is surely managed. In this case, the specified area for writing the first identification information can be set as an area inhibited to access from a user in terms of operation. This user access inhibited area is an area in which its attribute is set to make the user unable to access (read, write and modify) the information thereon using a program such as an editor program or the like. The first identification information is written to the user access inhibited area described above, thereby making it possible to prevent the user from reading the first identification information and copying the content of the first identification information as an item of second identification information from copying a content of the second identification information as an item of first identification information on the user access inhibited area. Accordingly, an illegal using conduct of the user can be prevented.

Further, each of the first identification information and the second identification information may be composed of plural items of identification data. The plural items of identification data are, e.g., vendor IDs, names of works of the software, etc.. If composed in this way, the software writable to the medium can be set in many ways by variously combining these plural items of identification data. Hence, there is no necessity for preparing the multiplicity of vendor IDs with respect to the individual vendors.

The comparing section may recognize that the first identification information corresponds to the second identification information when the first identification information is identical with the second identification information. If done in this manner, the management of the identification information is facilitated. However, if there are prepared a table showing a corresponding relationship between the items of identification information or a formula with a functionalized corresponding relationship between the items of identification information, the comparing section is capable of recognizing that the two items of identification information correspond to each other on conditions other than being identical.

The software writing section may be constructed to write the software to the medium while encrypting the software and to read the software from the medium while decrypting the software. With these constructions, before being read by the software reading section, the contents of the software can be encrypted to produce a state where the software can not be analyzed from the outside. Accordingly, the security can be ensured in a case where there are breaches of a reading condition such as a comparing condition in the comparing section.

There may be provided an indicating system for indicating when the software writing section writes the software to the medium, the effect of being written on the medium. In this case, there may be provided an inhibiting means for inhibiting the software writing section from writing the software to the medium when the indicating system performs the indicating on the medium.

If constructed in this way, the number of writing operation of the software can be restricted to one time, even in the case that the medium is a disk into which software can be written several times, such as above-described magneto-optic disk, or in the case that the medium is a disk which cannot be subjected to erase of software but into which plural set of software may be written depending on the capacity thereof. Accordingly, managing of the royalty can be ensured.

There may be provided a recording section for recording a number of times software can be written on the medium. In the case, there may be also provided an inhibiting section for inhibiting the software writing sections from writing the software in the medium when recorded number becomes 0.

If constructed in this way, the number of writing operations of the software can be set to plural number of times, and, besides, a larger number of writing operations than that number of times can be inhibited. Accordingly, the number of times with which the medium is usable can be set as plural number of times and managed.

There may be also provided a reading quantity recording section for recording a reading quantity of the software by the software reading section. With this provision, the running royalty corresponding to the reading quantity can be also collected.

According to the first construction of the present invention, the first identification information is previously written onto the medium. The first information reading section reads this first identification information. Further, the second identification information is contained in the software. The second information reading section reads this second identification information. The comparing section comparing the first identification information with the second identification information and thus checks whether or not the two items of information correspond to each other. When the comparing means determines that the two items of information correspond to each other, the software writing section writes this software to the medium. To the individual medium, the software containing the identification information corresponding to the identification information written to this medium is invariably written. Therefore, even when taking such a distribution mode that software and a medium are distributed in separation and the software running royalty is added to a sales price of the medium, the software running royalty is certainly paid back to the software rightful claimant. Further, the software rightful claimant is relieved from an operation of fixing the software to the medium before distributing the software.

According to the second construction of the present invention, the first identification information is previously written to the medium. It is assumed that the software and the second identification information contained in this software have been already written to this medium. The first information reading section reads this first identification information. Simultaneously, the second information reading section reads this second identification information. The comparing section compares the first identification information with the second identification information and thus checks whether or not the two items of information correspond to each other. When the comparing section determines that the two items of information correspond to each other, the software reading section reads this software from the medium. Thus, as far as the software containing the second identification information corresponding to the first identification information is written to the medium written with the first identification information, this software can be read. Accordingly, even if the user copies the software, the software can not be read from this medium unless the copied medium is a medium having the identification information corresponding to this software. Hence, even when copied, a profit of the software rightful claimant is endured. Accordingly, even when taking the distribution mode in which software and a medium are distributed in separation and the software running royalty is added to the sales price of the medium, the software running royalty is certainly paid back to the software rightful claimant.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention will hereinafter be described with reference to the drawings.

First Embodiment

<Principle of Embodiment>

Figure 1:
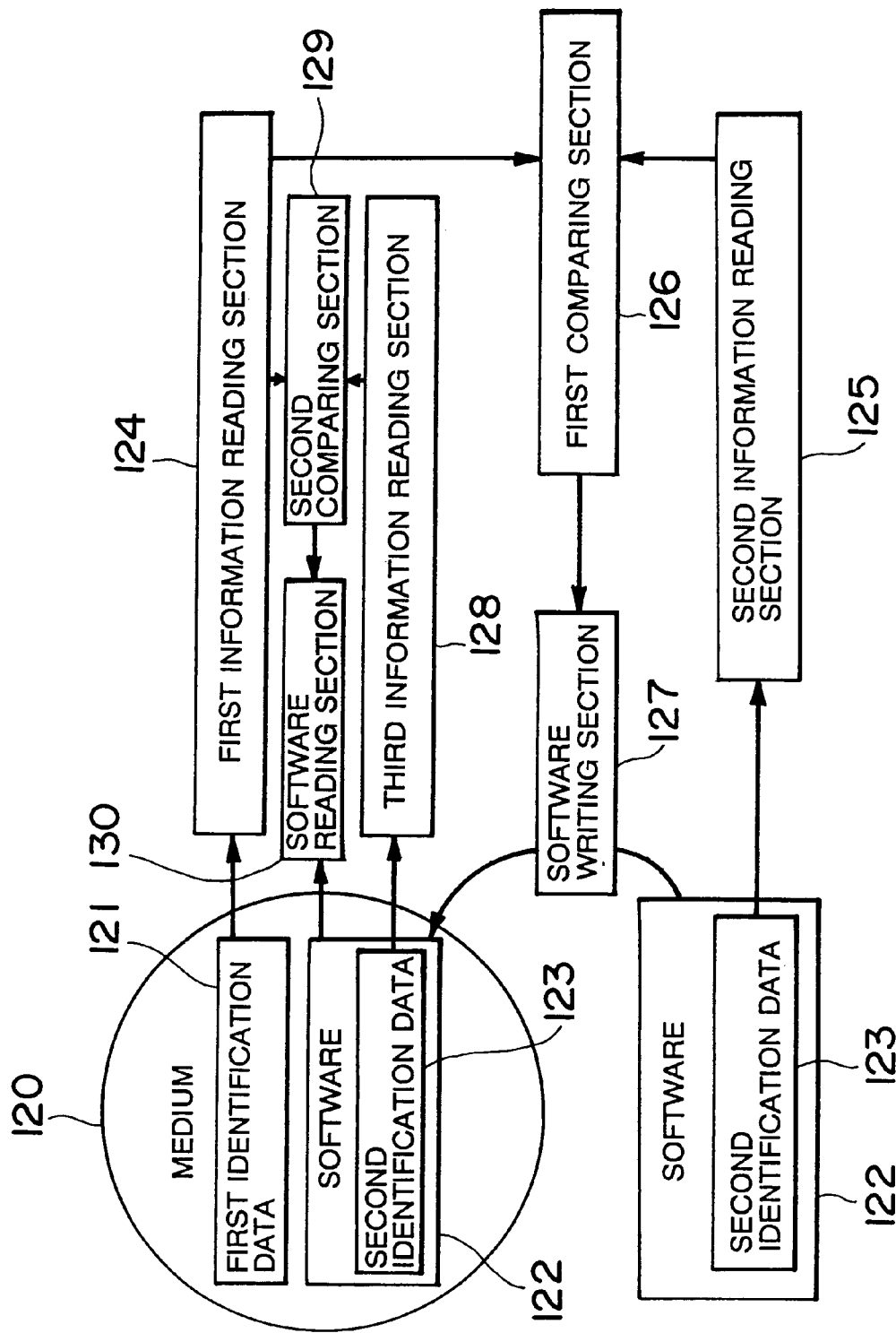
FIG. 1 is a view showing the principle of a first embodiment of the present invention.

The principle of this embodiment will be discussed referring to FIG. 1. A first identification data 121 is written to a medium 120. A first information reading section 124 reads the first identification data 121. Further, software 122 contains a second identification data 123. A second information reading section 125 reads the second identification data 123. A first comparing section 126 compares the first identification data 121 with the second identification data 123 and checks whether or not two items of data correspond to each other. If the first comparing section 126 determines that these two items of data correspond to each other, a software writing section 127 writes this software 122 to the medium 120.

On the other hand, if the software 122 and the second identification data contained in the software 122 are written to the medium 120, the first information reading section 124 reads the first identification data 121, and at the same time the third information reading section 128 reads the second identification data 123 contained in the software 122. A second comparing section 129 compares the first identification data 121 with the second identification data 123 read by the third information reading section 128 and thus checks whether or not the two items of identification data correspond to each other. If the second comparing section 129 determines that these two items of data correspond to each other, the software reading section 130 reads this software 122 from the medium 120.

Accordingly, as far as there is written software 122 containing the second identification data 123 corresponding to the first identification data 121 previously written to the medium 120, this software 122 is usable. Accordingly, even when taking such a distribution mode that the medium 120 and the software 122 are distributed in separation and adding a running royalty to a sales price of the medium 120, the running royalty of the software 122 is surely returned to a software rightful claimant. Besides, in case the user copies the software 122, this software 122 can not be read unless the medium 120 on which the copying is effected has the first identification data corresponding to the second identification data 123 contained in this software 122. Therefore, profits of the software rightful claimant are ensured. Further, the software rightful claimant is relieved from the operation of fixing this software 122 onto the medium 120 before distributing the software 122.

<Construction of Embodiment>

Figure 2:
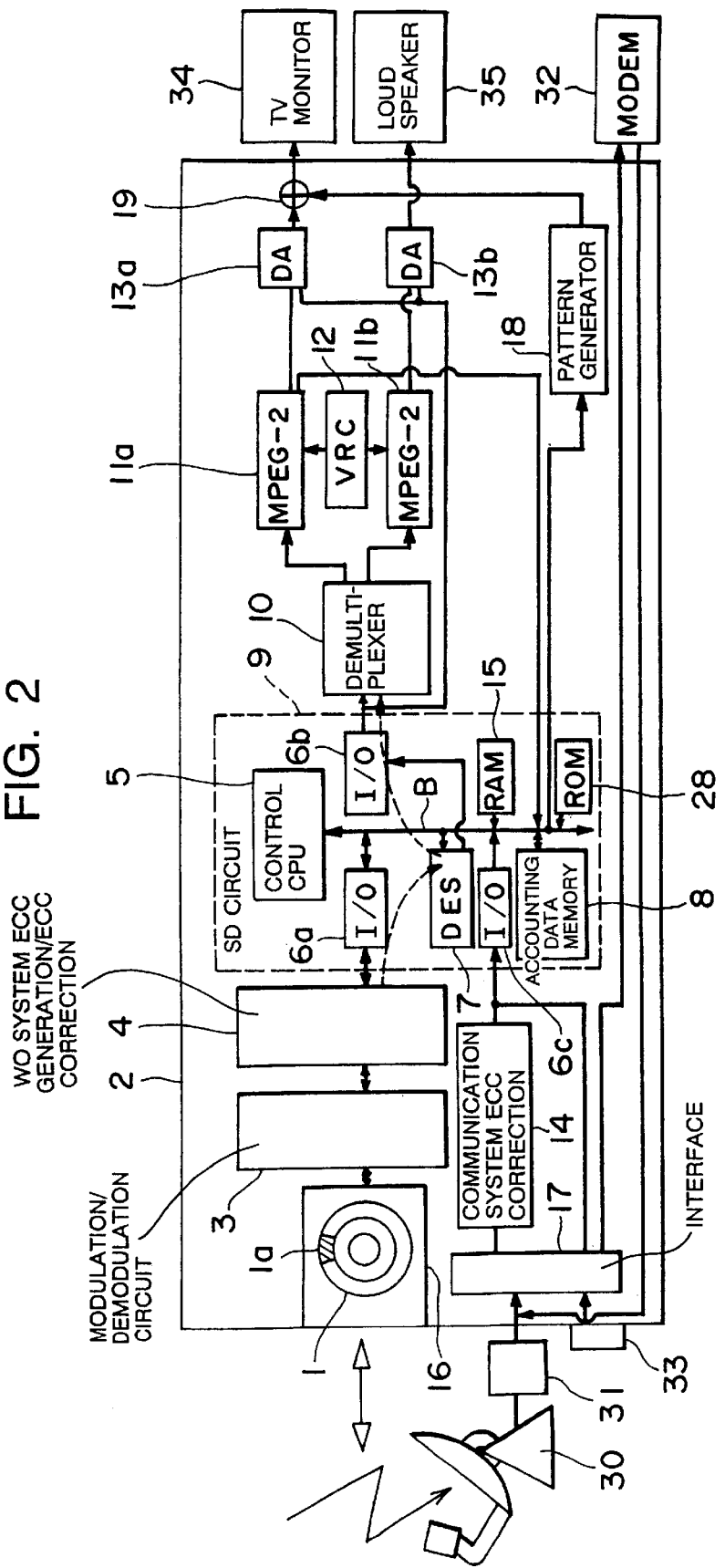
FIG. 2 is a block diagram illustrating a construction of a software reproducing apparatus in the first embodiment of the present invention.

FIG. 2 is a block diagram illustrating a construction of a software reproducer employed in a first embodiment of the present invention.

A software reproducer 2 conceived as a user's terminal is an information apparatus usable by receiving a variety of software offered via media such as satellite broadcasting, cable broadcasting through ISDN lines and so on. The variety of software take forms of digital data such as audio data, image data, character data and a computer program, etc.. Then, contents of the variety of software may be a computer program and data for the program hitherto offered through a floppy disk, a TV program hitherto broadcasted by an analog TV system, a movie program hitherto offered through a video tape and a video disk, music data hitherto offered through radio broadcasting and a compact disk and also still picture data of a photo, etc . . . .

That is, this software reproducer 2 is an information apparatus capable of unitedly dealing with the variety of software offered in the common data format. More specifically, the reproducer 2 incorporates functions to read the multiple software, to execute the computer program, to reproduce the movie program, the TV program (reproduce video and audio signals) and the music data (reproduce the audio signal) and also to display the still picture.

Herein, the format of the multiple software received by the software reproducer 2 will be explained. That is, with respect to the video and audio data, frames each conceived as plural items of unit data are consecutively formed, thus constituting a set of software. Then, the video and audio data frames are A/D converted before being transmitted to the software reproducer 2. Subsequently, the A/D converted data frames are compressed in conformity with standards of MPEG-2. Herein MPEG-2 indicates video data compression standards recommended by MPEG (Motion Picture Image Coding Experts Group), wherein the basic video format involves CCIR601 standards (4:2:2 format) and HDVT (up to 1920×1080 lines/frame). On the other hand, the MPEG standards are related to the video signals and the audio signals, so that the computer program does not undergo the compression processing by MPEG-2.

The variety of thus processed software are transmitted in the form of radio waves by the satellite broadcasting or in the form of electric signals by the cable broadcasting through the ISDN. In the former case, the radio waves are received by a parabolic antenna 30. Then, the radio waves are demodulated and inputted to an interface unit 17. On the other hand, in the latter case, the electric signals are received by a MODEM (Modulator/Demodulator) 32. Then, the electric signals are demodulated by the MODEM 32 itself and then inputted to the interface unit 17.

This interface unit 17 performs I/O processing between an operation key 33 provided on an outer surface of this software reproducer 2, external devices (demodulator 31 and MODEM 32) and an internal circuit of the software reproducer 2. Note that the operation key 33 is a device for inputting a variety of commands and user information of passwords, ID codes, etc..

The signal inputted to the interface unit 17 from the demodulator 31 or the MODEM 32 is subjected to processing such as an error check code correction and a bit rearrangement by a communication system error processing unit 14 and then inputted to an I/O unit 6c of an SD circuit 9. On the other hand, the signal inputted to the interface unit 17 from the operation key unit 33 is inputted directly to the I/O unit 6c of the SD circuit 9.

Next, the medium loaded into the software reproducer 2 is a write-once optical disk (hereinafter abbreviated to WO) 1. The software reproducer 2 reads bits formed on the surface of the WO1 by a reflection of a laser beam as in the case of an ordinary CD-ROM, but the user is capable of forming the bits on the surface of the WO1 by an irradiation of the laser beams. That is, the data can be written on the WO1. It is, however, impossible to erase the bits which have been once formed, and, hence, the WO1 exhibits such a characteristic that the written data can not be erased.

In accordance with this embodiment, the WO1 is provided with a system area 1a serving as a user unaccessible area. This system area 1a has its attributes set so that the user is not allowed to perform accessing for reading, writing and modifying the data. Identification data for specifying software writable to this WO1 is written beforehand to this system area 1a. This identification data may be an item of data for specifying a software group consisting of plural sets of software. In this instance, this identification data may be an ID for identifying a vendor for offering (vending) this software group (hereinafter called a vendor ID). This vendor ID may be an ID for identifying a plurality of vendors. Even if designed for the same vendor, the vendor ID may be different for every software group. This is designed for a case where a level of charge per unit data is different as in the case of, e.g., music software and movie software. Further, plural items of identification data such as a vendor ID, a name of work, etc. are combined to form a set of identification data in some cases.

An explanation will hereinafter proceed taking an example where the data written to this system area 1a is the vendor ID.

This WO1 ia available at a sales shop. It is desirable that the sales shop sells the WO1s to which a variety of vendor IDs are written, and that the user as a customer can select a WO1 to be purchased with this vendor ID being a key. The vendor previously adds a charge for the software (software running royalty) transmitted on the satellite broadcasting or the cable broadcasting to the sale price of this WO1. Accordingly, the sales price may differ depending on the vendor ID written to the WO1.

Note that the WO1 is provided with a space to which plural sets of software are written in some cases. In preparation for such a case, the system area 1a is stored with number-of-approval data. This number-of-approval data indicates the number of sets of software recordable on this WO1. In other words, the number-of-approval data indicates the number of sets of software which correspond to an amount of royalties added beforehand to the sales price of this WO1. The WO1 is, however, an unerasable/ unrewritable medium, and, hence, the number of sets of the recordable software is managed in such a form that flags showing a already-recorded status are written one by one to a bit string indicating the number of remaining sets of recordable software. Accordingly, if the number of initial recordable software is 1, the flag indicating the already-recorded status functions as a flag showing whether or not the whole WO1 has been already used.

Further, the software identified by the vendor ID may be classified not as a sell type but as a rental type for collecting a running royalty per reproduction (use). In such a case, the running royalties are collectable based on an SD circuit function which will be mentioned later. Therefore, the sales price of the WO1 to which a vendor ID for the rental type is written is restrained down to a comparatively low price.

The WO1 is loaded into a WO disk drive 16 of the software reproducer 2. The WO disk drive 16 is capable of performing only one writing process to an area exclusive of the system area 1a of the WO1 and semipermanently repeatedly reading the data which has been once written.

A modulation/demodulation circuit 3 is connected to this WO disk drive 16. This modulation/demodulation circuit 3 is also connected to a WO system error processing unit 4. This WO system error processing unit 4 is connected to the I/O unit 6a of the SD circuit 9.

The modulation/demodulation circuit 3 incorporates a function of converting (modulating) a format of the data transmitted from the SD circuit 9 into a data format in which the data is writable to the WO1 as well as converting (modulating) a format of the data read from the WO1 into such a data format that the SD circuit 9 can deal with the data.

The WO system error processing unit 4 is constructed of an error check code generating section and an error check code correcting section. The error check code generating section functions when data written to the WO1, while the error check code correcting section functions when data read from the WO1. That is, the error check code generating section writes an error check code corresponding to the WO1 into the data. On the other hand, the error check code correcting section corrects an error of data and rearranges the bits of the data on the basis of this error check code.

Given next is an explanation of the SD circuit 9 connected to the WO system error processing unit 4, the communication system error processing unit 14 and the interface 17. The software reproducer 2 is supplied with the variety of software through the above-described satellite broadcasting and the cable broadcasting. Accordingly, it is a question to determine which software is written to the WO1. Further, even in the case that software has been once written to the WO, it is a question to determine what method to be taken to make accounting of a compensation in the above-mentioned rental type. The SD circuit 9 is employed for this purpose.

Figure 3:
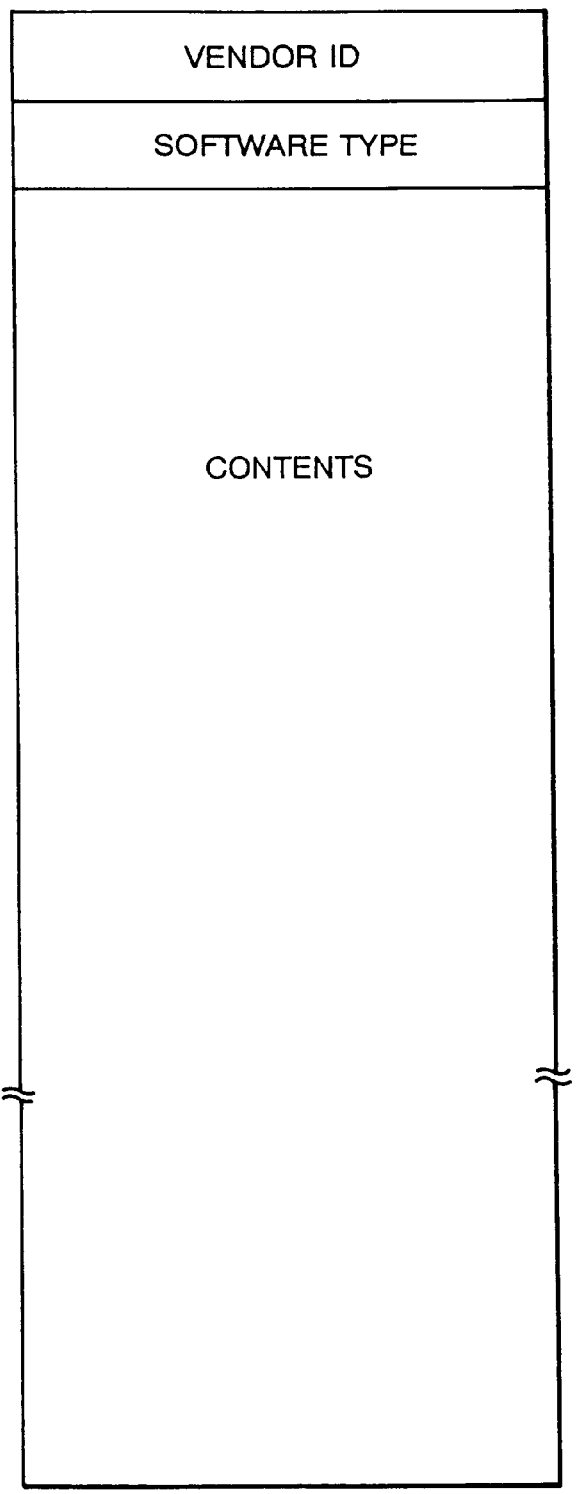
FIG. 3 is an explanatory diagram illustrating a structure of software used in the first embodiment of the present invention.

More specifically, as described above, the vendor ID as the first identification data is written beforehand to the system area 1a of the WO1 available in the sales shop. Then, as illustrated in FIG. 3, the same vendor ID is, as the second identification data, attached to the heading of the software broadcasted. Note that the vendor ID attached to this software is a part of the software. The SD circuit 9, just when the WO1 is loaded into the WO disk drive 16, reads the vendor ID of this WO1. Then, only when the software received has the vendor ID identical with this vendor ID, the SD circuit 9 enables this software to be written to the WO1.

On the other hand, in case the specified software is once written to a certain WO1, this software may be copied on other WO. In such a case, if the vendor ID of the WO1 on which the copying is effected belongs to the vendor of this software, a benefit of this vendor is ensured. If copied on the WO1 to which the vendor ID of this software is not written, however, a loss of the vendor of the software has to be prevented. For this purpose, the SD circuit 9, when reproducing the software, reads the vendor ID written to the system are 1a of the WO1 loaded into the drive 16 and also the vendor ID added to the heading of the software written to the WO1 and then compares these vendor IDs with each other. Then, only when the two vendor IDs are identical with each other, the SD circuit 9 permits the reproduction of this software but, if not identical with each other, inhibits the reproduction of the software.

Further, in the case of the above-described rental type, it is necessary to establish such a system that the software running royalty can be imposed for every reproduction, and the software can be made impossible of reproduction if the running royalty can not be paid. For this purpose, the SD circuit 9 once encrypts the variety of software received and writes the encypted software to the WO1. The variety of encrypted software are, when reproduced, sequentially decrypted by the SD circuit 9. At the same time, the SD circuit 9 subtracts a credit X each time the rental-type-software is decrypted. This credit X is a point written to an accounting data memory 8 of the SD circuit 9, corresponding to an amount of money prepaid by the user to the vendor. A charge corresponding to this credit X bears a characteristic as a prepaid running royalty of the rental-type-software. The SD circuit 9, when this credit X becomes 0 (unusable value), keeps a security of the software by stopping the decrypting.

Note that this SD circuit 9 is actualized in the form of an IC card which is detachably inserted into a card slot (e.g., a card slot pursuant to PCMCIA) of the software reproducer 2. Since the IC card form is taken, the SD circuit 9 is easy to transport. Accordingly, the user brings it to a software sales shop (software vendor) or the like, and the credit X may be added in exchange for a payment of the price.

This SD circuit 9 is constructed of a control CPU 5, a DES (Data Encryption Standard) 7, an accounting data memory 8 and I/O units 6a, 6b, 6c which are mutually connected through the bus B.

The control CPU 2 controls transferring and receiving the data between the communication system error processing unit 14, the interface unit 17, the WO system error processing unit 4, a demultiplexer 10 and a pattern generator 18. Further, the CPU 11 incorporates a function of controlling the DES 7 and the accounting data memory 8.

The control CPU 2 has a function of causing a RAM 15 to store a user's password and also a function of, when the user operates this software reproducer 2, effecting an ID check by comparing a password inputted by the user with a password within the RAM 15. Then, the control CPU 2 generates an item of approval data only when the two passwords are identical with each other. This item of approval data is used as a key for executing the encryption and decryption in the DES 7. Accordingly, if the approval key is generated, it is possible to perform encrypting, recording, decrypting and reproducing. If the approval key is not generated, however, these processes can not be executed. This item of approval data is created based on the password inputted each time the software reproducer 2 is started up. Then, the approval data is stored in the RAM 15 till the software reproducer 2 is stopped.

The control CPU 2 is capable of performing a variety of arithmetic operations and data processing by executing the software (programs) stored in the WO1. That is, the control CPU 2 has a function as a general-purpose computer.

The accounting data memory 8 is a table for storing the above-mentioned credit X. Note that the credit X is encrypted in the accounting data memory 8. Accordingly, it is impossible for a person other than the software rightful claimant to rewrite the credit X by analyzing the accounting data memory 8.

In addition to the above passwords and the approval data, when the rental-type-software reproduced, the vendor ID of the software and a reproducing time thereof are recorded in the RAM 15 connected to the system bus B. Incidentally, this vendor ID and the reproducing time are encrypted by the DES 7 so as not to be accessed by the user and also read by the sales shop in case the SD circuit 9 is brought to the sales shop to be added the credit X. This item of data is employed when the software running royalty corresponding to the credit X is divided among vendors.

A ROM 28 connected to the system bus B stores the software (including OS) for making use of this SD circuit 9.

The DES 7 serving as an encrypting/decrypting device has a function of encrypting the software received from the communication system error processing unit 14, a function of decrypting the software received from the WO system error processing unit 4 and a function of encrypting the above password and the credit X.

Figure 4:
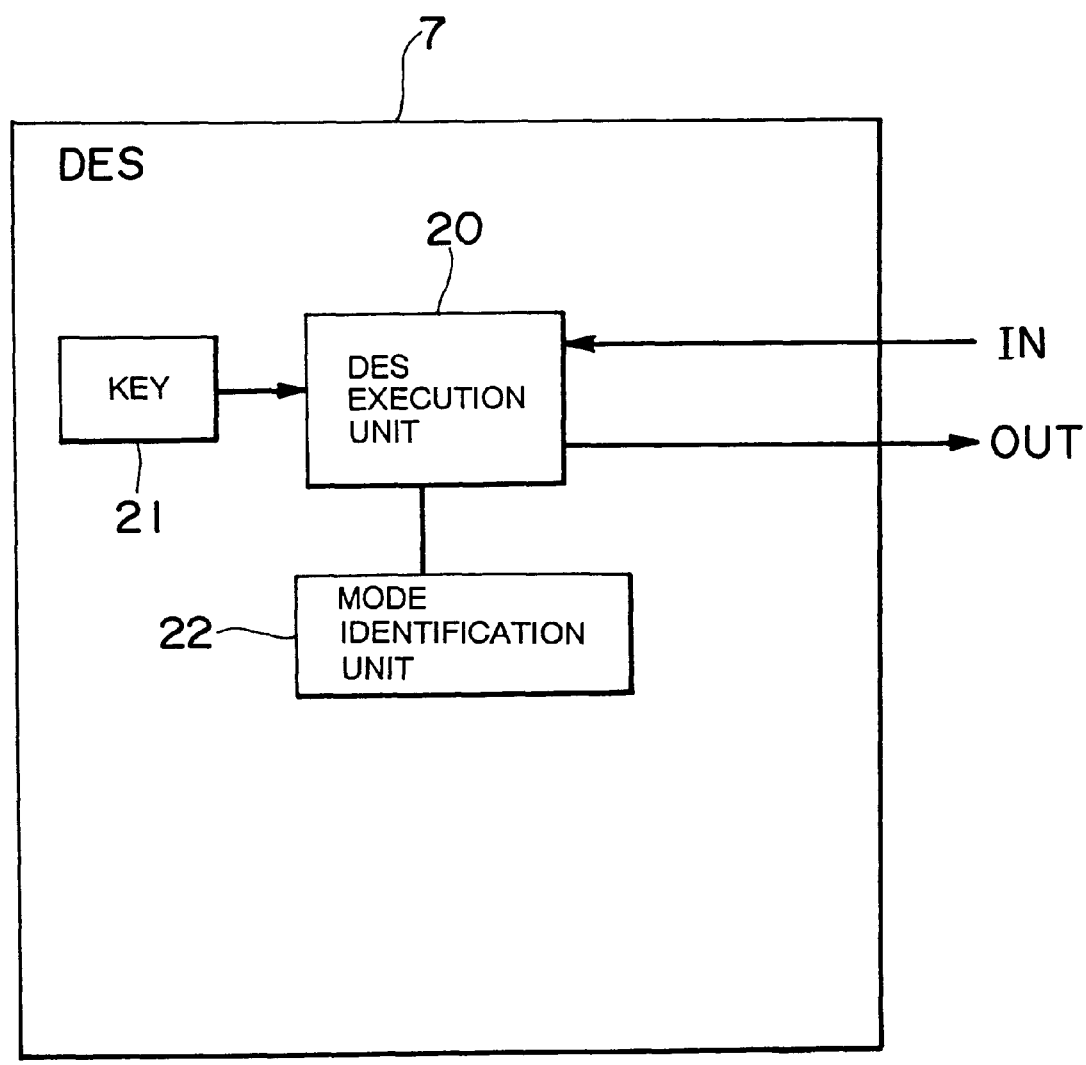
FIG. 4 is a block diagram schematically illustrating a configuration of a DES.

FIG. 4 schematically illustrates a configuration of the DES 7. The DES 7 includes, as shown in FIG. 4, a DES execution unit 20 incorporating a function to encrypt or decrypt input data (IN) on the basis of key data (herein, the approval data) 21 and output it in the form of output data (OUT). In accordance with this embodiment, the DES execution unit 20 has a mode identification unit 22. This mode identification unit 22 has a function to select an optimal mode on the basis of a data format, etc. from a plurality of DES modes and supply this optimal mode to the DES execution unit 20. Note that this DES 7 may involve the use of an IC chip (46DATA ENCRYPTION STANDARD NIST) made by Phillips Publication Corp.

Figure 5:
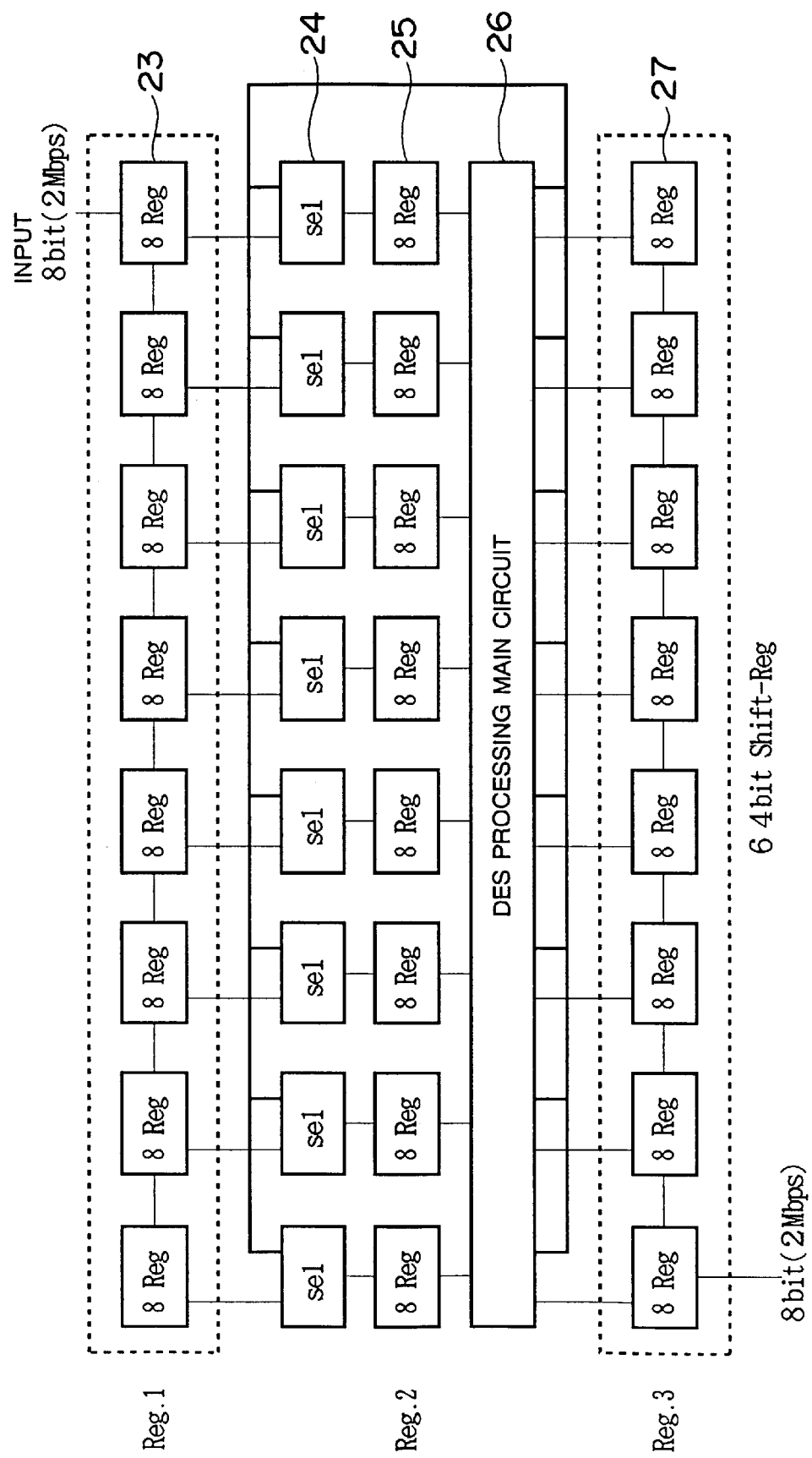
FIG. 5 is a block diagram showing a specific configuration of the DES.

FIG. 5 is a block diagram illustrating a specific hardware architecture of the DES execution unit 20. Referring to FIG. 5, a 64-bit shift register (REG1) 23 composed by connecting eight pieces of 8-bit registers is disposed as an input buffer on the input side. At the next stage, a selector units (sel) 24 are connected. These selector units (sel) 24 are constructed to selectively input an output data from a DES processing main circuit 26 which will be mentioned later or an output data from the shift register (REG1) 23.

An 8-bit registers (REG2) 25 are connected at the next stage of the selector unit (sel) 24, and a DES processing main circuit 26 is connected at the stage further next thereto. This DES processing main circuit 26 is the center of the DES. That is, in the DES processing main circuit 26, a variety of DES modes are registered in a ROM (Read Only Memory), and the decode processing is carried out by selecting a logic in an optimal DES mode in response to an indication from the control CPU 5. An output of the DES processing main circuit 26 is inputted to an output register (REG3) 27 serving as an output buffer as well as to the selector units (sel) 24. Then, an output of the output register (REG3) 27 is employed as an item of encrypted or decrypted data.

Figure 6:
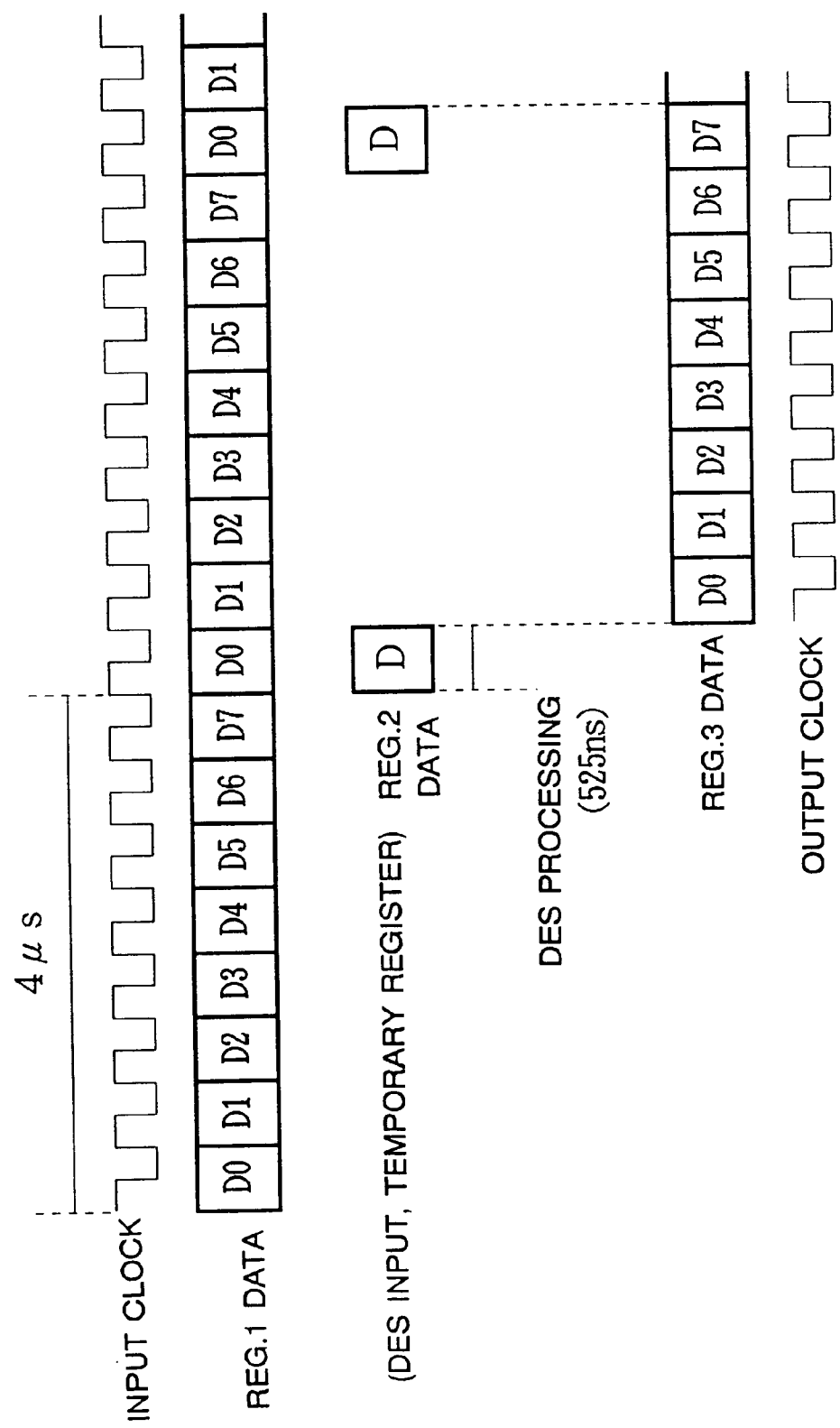
FIG. 6 is a timing chart showing I/O timings of the DES.

FIG. 6 shows a sequence of this processing. Referring to FIG. 6, an output of the shift register (REG1) 23 is DES-processed as an output from the register (REG2) 25 with a first clock at the next cycle, and an output from the output register (REG3) 27 with the next clock. During a period of the output from the output register (REG3) 27 on the input side, the input register (REG1) 23 takes in the encrypted data of the next cycle.

Thus, in accordance with this embodiment, there are independently provided the input register (REG1) 23 as the input buffer and the output register (REG3) 27 as the output buffer, thereby making it possible to consecutively independently input the encrypted data and output the decrypted data. Therefore, the decryption processing and the encryption processing can be executed at a higher speed than in the case of cyclically performing the inputting and outputting as in the conventional DES.

Referring back to FIG. 2, the control CPU 5 transmits the software inputted from the communication system error processing unit 14 via the I/O unit 6c and encrypted by the DES 7 to the WO system error processing unit 4 outside the SD circuit 9 via the I/O unit 6a. Further, the control CPU transmits the software (video, audio) inputted from the WO system error processing unit 4 via the I/O unit 6a and decrypted by the DES 7 to the demultiplexer 10 outside the SD circuit 9 via the I/O unit 6b. The demultiplexer 10 demultiplexes the received software into audio data frames and video data frames. Then, the video data frame is outputted to an MPEG expansion circuit (MPEG-2) 11a, while the audio data frame is outputted to an MPEG expansion circuit (MPEG-2) 11b.

The MPEG expansion circuits (MPEG-2) 11a, 11b serving as expansion devices are circuits for expanding the video or audio data frame transmitted in an a-compressed status on the basis of the MPEG standard to restore the signal possible of output the image or voice. When the data frames are expanded by these MPEG expansion circuits (MPEG-2) 11a, 11b, a VRC circuit 12 takes synchronism of the outputs of the circuits 11a, 11b. That is, the MPEG expansion circuits (MPEG-2) 11a, 11b output the expanded data frames in synchronism with synchronous signals outputted from the VRC circuit 12. Note that the MPEG expansion circuits 11 may involve the use of an IC chip (ISO/IEC CD 13818'1-3).

The output from the MPEG expansion circuit for video data (MPEG-2) 11a is converted into an analog signal by a D/A converter 13a. This analog signal is outputted toward a TV monitor unit 34 connected to the software reproducer 2 via an adder circuit 19. Further, the output from the MPEG expansion circuit for audio data (MPEG-2) 11b is converted into an analog signal by a D/A converter 13b. This analog signal is outputted directly to a loud speaker 35 connected to the software reproducer 2.

The MPEG expansion circuit for video data (MPEG-2) 11a outputs a completion-of-frame-expansion signal each time an expanding process of the individual compressed data frame is completed. This completion-of-frame-expansion signal is received by the control CPU 5 and then used for controlling the accounting. That is, the control CPU 5 receiving this completion-of-frame-expansion signal subtracts the credit X written to the accounting data memory 8 and also controls the data output hindrance when the credit X becomes 0.

The control CPU 5 executes the software (program or data thereof) inputted from the WO system error processing unit 4 via the I/O unit 6a and decrypted by the DES 7, thus effecting the variety of arithmetic operations and data processing. As a result of performing this arithmetic operation or the data processing, the video data and the audio data are generated. This audio data and the video data are outputted outwardly of the SD circuit 9 via the I/O circuit 6b. Then, the video data is inputted directly to the D/A converter for video signal 13a and displayed on the TV monitor 34. Further, the video data is inputted directly to the D/A converter for audio signal 13b and outputted from the loud speaker 35.

The pattern generator 18 is also connected to the system bus B within the SD circuit 9. This pattern generator 18 is connected to an adder circuit 19 connected to an output terminal of the D/A converter for video signal 13a.

The pattern generator 18 generates image patterns for displaying pieces of character data having such effects that, e.g., "Unrecordable", "Unreproducable" and "Inexecutable". Image pattern signals outputted from this pattern generator 18 are inputted to the adder circuit 19.

The adder circuit 19 superimposes the image pattern signals outputted from the patter generator 18 on the video signal outputted from the D/A converter 13a and outputs the signals to the TV monitor unit 34. Accordingly, the adder circuit 19, when the image pattern signal from the pattern generator 18 is switched OFF, outputs an analog video signal as it is, which has been outputted from the D/A converter 13a. Whereas if the image pattern signal is switched ON, the adder circuit 19 outputs the analog video signal outputted from the D/A converter 13a on which the image pattern is superimposed. However, when the image pattern signal is switched ON, no software is outputted from the SD circuit 9, and hence, as a result, only the image pattern is outputted.

A flow of processing executed by the control CPU 5 explained above will be described with reference to flowcharts of FIGS. 7 through 9.

Figure 7:
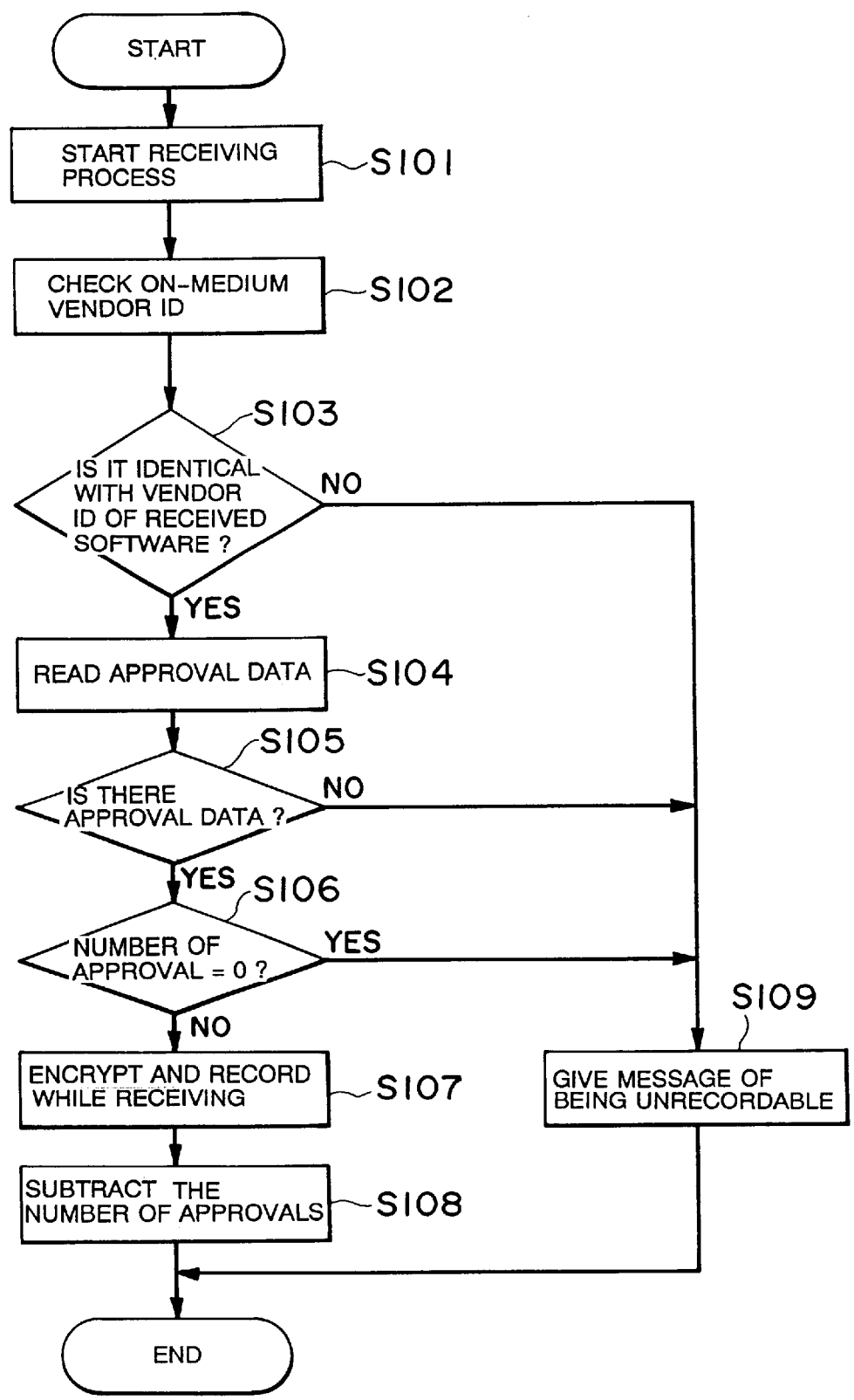
FIG. 7 is a flowchart showing the receiving process executed when the software received.

FIG. 7 is a flowchart illustrating the processing to receive the software. This processing starts with a "Record" command inputted from the operation key 33 after the WO1 has been loaded into the WO disk drive 16 of the software reproducer 2.

In first step S101 after the start, a receiving process is started. That is, a status of the interface unit 17 is set so that the software given from the outside can be received. Then, when the software is transmitted through the satellite broadcasting, there is a wait for the start of the broadcasting thereof, and the processing proceeds to step S102. On the other hand, when the software is transmitted via a telephone line, a command for starting a download of the software is transmitted to a transmitting management center, and thereafter the processing proceeds to step S102.

In step S102, the vendor ID written to the system area 1a of the WO1 is read from the WO disk drive 16 and then checked.

Subsequently, if the vendor ID on this system area 1a is not identical with the vendor ID written to the heading of the software, it is determined that the software is not scheduled to be recorded on the WO1. Accordingly, in this case, the processing proceeds from step S103 to step S109. In step S109, an indication is given to the pattern generator 18 to display a message with the effect that "Unrecordable" on the TV monitor 34. Then, this receiving process is finished as it is.

Whereas if the vendor ID on the system area 1a is identical with the vendor ID written to the heading of the software, it is determined that the software is scheduled to be recorded on the WO1. Hence, in this instance, the processing proceeds from step S103 to step S104. In step S104, the approval data stored in the RAM 15 is read.

Whether or not the approval data has been read in step S104 is checked in subsequent step S105. If the approval data can not be read, steps subsequent thereto are inexecutable. The processing therefore proceeds to step S109 wherein a message with the effect that "Unrecordable" is displayed, and the receiving process is finished as it is.

On the other hand, in step S105, when it is determined that the approval data has been read, the number of approvals stored in the system area 1a of the WO1 is read from the WO disk drive 16 in subsequent step S106, and this numerical value is checked. Specifically, this checking of the numerical value is done depending on the number of bits in which no recorded flag is set among the bit strings corresponding to the remaining number of recordable software. When the number of approvals is 0 (when the recorded flags are set in all the bits), the determination is that a recordable number of software (which corresponds to the royalties added beforehand to the sales price of the WO1) have already been recorded. Hence, the processing proceeds to step S109 wherein the message with the effect that "Unrecordable" is displayed, and the receiving process is finished as it is.

On the other hand, when determining that the number of approvals is 1 or larger (when there are left the bits in which the recorded flags are not set) in step S106, the processing goes forward to step S107. In this step S107, the software is received through the interface unit 17, while the received software encrypted by the DES 7 with the approval data serving as a key. Then, the encrypted software is transmitted to the WO disk drive 16 and recorded on WO1.

When completing the record of the software in step S107, the processing proceeds to step S108. In this step S108, 1 is subtracted from the number of approvals recorded on the system area 1a of the WO1. More specifically, a single piece of flag indicating the already-recorded status is set in the bit strings showing the remaining number of recordable software. Thereafter, this processing is finished.

Figure 8:
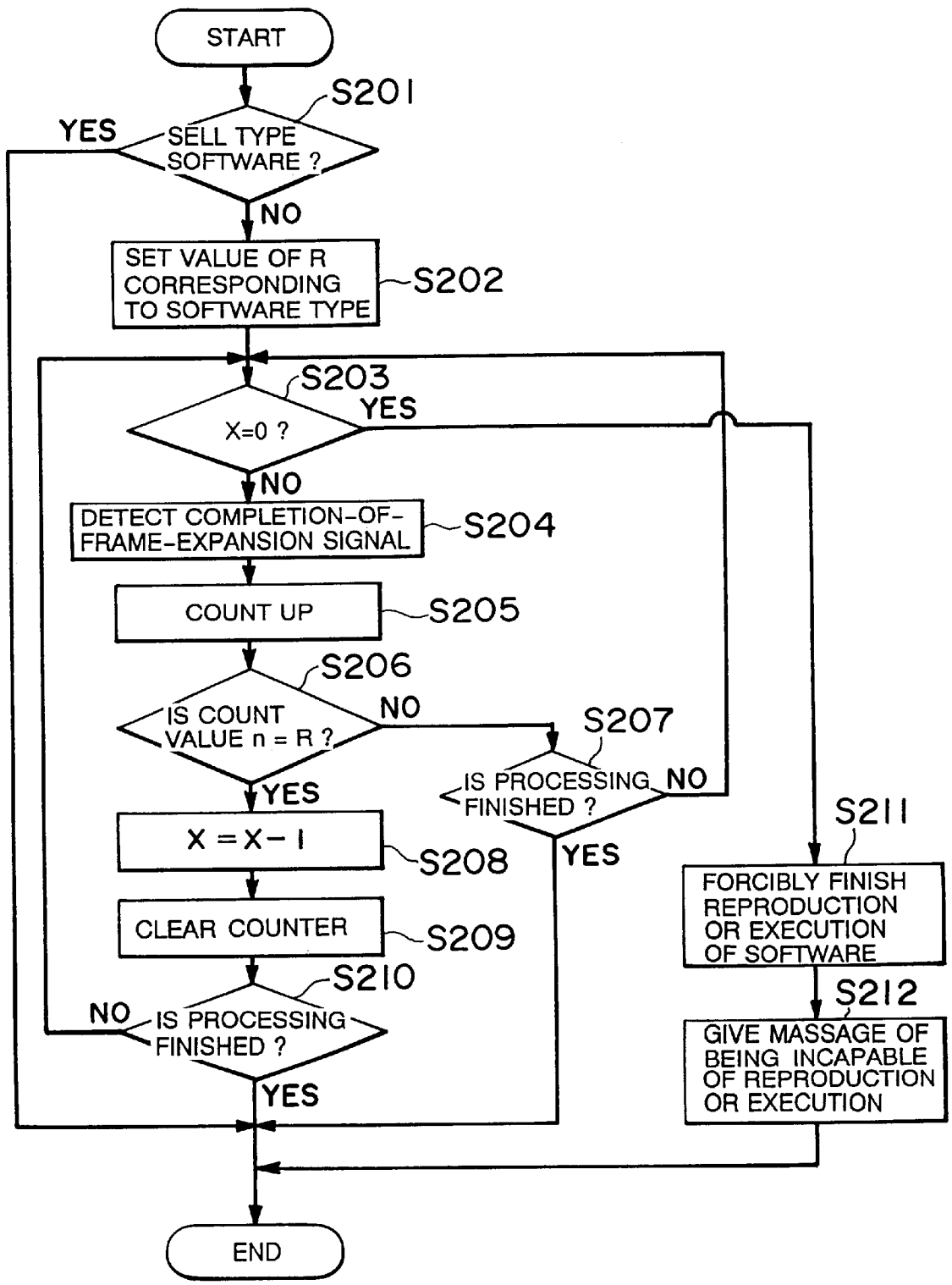
FIG. 8 is a flowchart showing the subtracting process of a credit which is executed when the software reproduced or executed.
Figure 9:
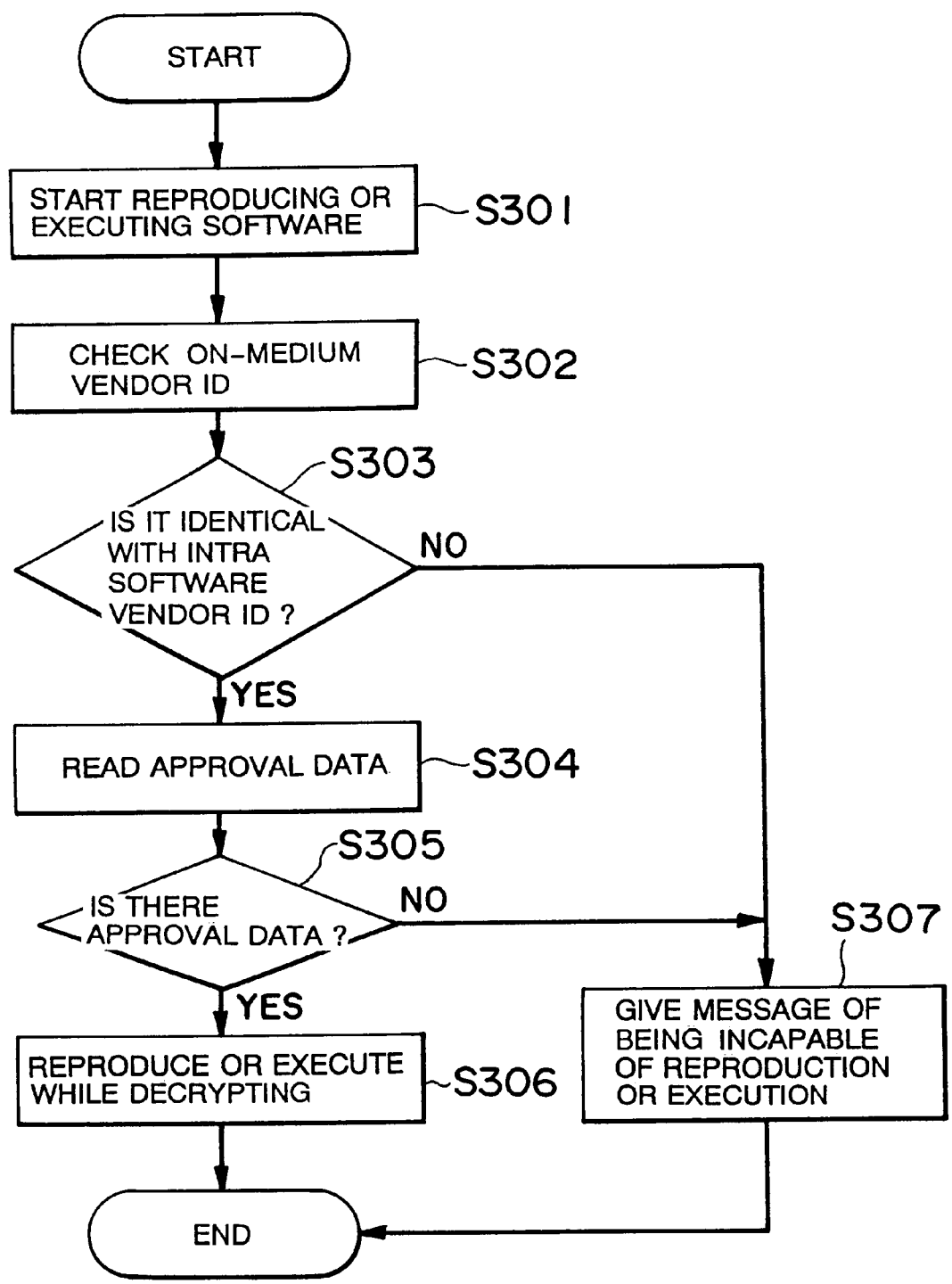
FIG. 9 is a flowchart showing the software reproducing or executing process executed when the software reproduced or executed.

FIGS. 8 and 9 are flowcharts each showing processes to reproduce the software recorded on the WO1. Each of these processes starts with the "Reproduction" command inputted through the operation key 33 after loading the WO1 recorded with the software into the WO disk drive 16 of the software reproducer 2. Then, after the start, the two processes are executed in parallel in asynchronism. A content of each process will hereinafter be explained.

FIG. 8 shows an accounting process for the rental type software. In accordance with the processes of FIG. 8, in first step S201, there is checked whether this software is the sell type or the rental type according to the software types (see FIG. 3) written to the heading part of the software. The software type indicates a running royalty (a charge corresponding to a using quantity) in the case of the rental type in addition to the classification of whether the software is of the sold-out type or the rental type. In the case of the software type being defined as the sell type, there is no necessity for subtracting the credit X of the accounting data memory 8, and hence the processing comes to an end as it is.

Contrastingly, in the case of being the rental type, a reference value R is set corresponding to the software type, that is, the running royality acounting rate in step S202. That is, in the case of the software type requiring a high running royalty. the reference value R is set comparatively small. While in the case of the software type requiring a low running royalty, the reference value R is set comparatively large.

In next step S203, whether the credit X within the accounting data memory 8 is 0 or not is checked. When the credit X is 0, the reproduction of the software of the rental type is not allowed any more. For this reason, the processing proceeds to step S211, wherein the reproducing processing of FIG. 9 is forcibly finished. Next in step S212, an indication is given to the pattern generator 18 to display a message with the effect that "Unreproducable or inexecutable" on the TV monitor 34. Then, the receiving process is finished as it is.

On the other hand, when the credit X is 1 or greater, the processing proceeds to step S204, wherein a completion-of-frame-expansion signal from the MPEG extension circuit 11a is detected. When the completion-of-frame-expansion signal has been detected, the processing goes to step S205, wherein a count value n of a software counter formed within the control CPU 5 is counted up by 1.

In subsequent step S206, the control CPU5 determines whether or not the count value n reaches a reference value R. Then, if the count value n does not yet reach the reference value R, the CPU5 determines whether or not the accounting process is finished or not in step S207.

This determination in step S207 is effected based on whether or not the reproduction of the software has been finished. More specifically, if the reproduction has been finished, the accounting process is finished. Whereas, if the reproduction has not been finished, the CPU5 determines that the accounting process is to be continued and backs the process to step S203.

On the contrary, when determining that the count value n reaches the reference value R, in step S206, the processing proceeds to setp S208. In setp S208, the credit X within the accounting data memory 8 is subtracted by 1.

In subsequent step S209, the count value n is cleared to "0".

In step S210 subsequent thereto, as in the same way with step S207, whether or not the accounting control processing is to be finished is determined. Then, in the case of determining that the accounting control process continues, the processing goes back to step S203. In contrast with this, when determining that the accounting control process is finished, the processing comes to an end.

FIG. 9 shows processes of decrypting and reproducing (executing) the software. According to the processes of FIG. 9, in first step S301, the reproduction or the execution of the software is started. That is, the software is set in a readable status with the WO disk drive 16 started up.

In subsequent step S302, the vendor ID written in the system area 1a of the WO1 and the vendor ID written to the heading of the software recorded on the WO1 are read and checked.

Then, if the vendor ID written in this system area 1a is not identical with the vendor ID written to the heading of the software, the determination is such that the software is temporarily recorded on the WO1 (WO having the same vendor ID) and thereafter copied on an irregular WO (WO having a different vendor ID or no written vendor ID). Accordingly, in this case, for preventing a loss of profit of the software vendor, the processing proceeds from step S303 to step S307. In step S307, an indication is given to the pattern generator 18 to display the message with the effect that "Unreproducable" or "inexecutable" on the TV monitor 34. Then, the receiving process is finished as it is.

Whereas if the vendor ID written in the system area 1a is identical with the vendor ID written to the heading of the software, the determination is that the WO1 is a regular WO1 with respect to the relevant software, that is, the WO having the same vendor ID, regardless of whether the software recorded thereon is copied or not. Hence, in this instance, the processing proceeds from step S303 to step S304. In step S304, the approval data stored in the RAM 15 is read.

Checked in subsequent step S305 is whether or not the approval data has been read in step S304. If the approval data has not been read, the processes subsequent thereto can not be executed. Therefore, the processing proceeds to step S307, wherein the message with the effect that "Unreproducable" or "inexecutable" is displayed, and the receiving process is finished as it is.

On the other hand, when determining that the approval data has been read in step S305, the processing goes to step S306. In this step S306, the software is received through the WO system error processing unit 4, and this received software is decrypted by the DES 7 with the approval data serving as a key. Then, the decrypted software (video, audio) is transmitted to the demultiplexer 10 and then reproduced. Further, the decrypted software (program and data thereof) is executed by the control CPU 5, and a variety of arithmetic operations or data processing is to be conducted. Thereafter, this processing is finished.

Figure 10:
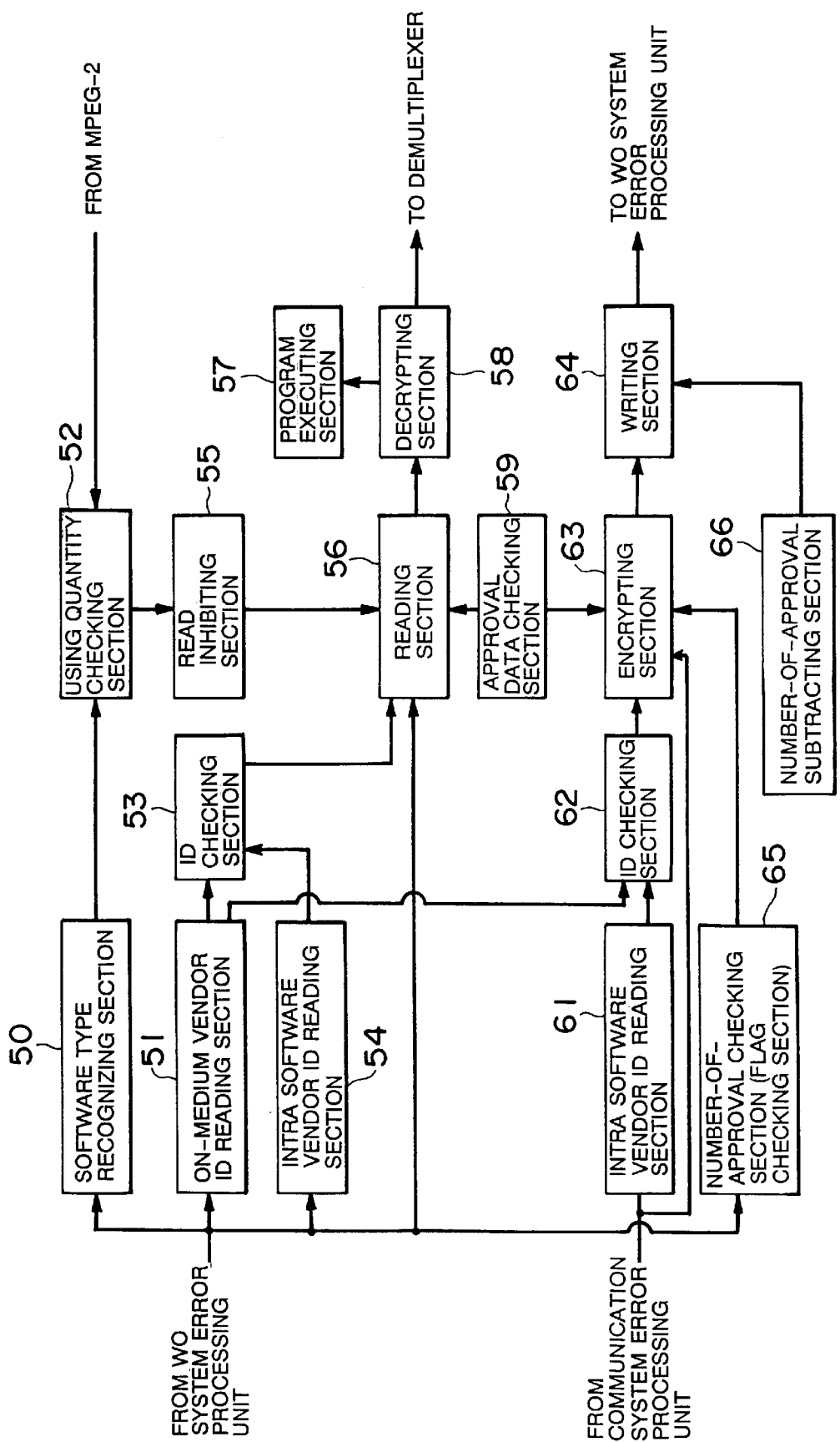
FIG. 10 is a functional block diagram illustrating functions within a control CPU.

Functions generated within the control CPU 5 as a result of executing the above processes will be discussed based on FIG. 10. The signals from the WO system error processing unit 4 are inputted to a software type recognizing section 50, an on-medium vendor ID reading section 51 serving as a first information reading section, an intra-software vendor ID reading section 54 serving as a third information reading section, a reading section 56 as a software reading section and a number-of-approval checking section (flag checking section) 65 serving as an inhibition/display section. On the other hand, the signals from the communication system error processing unit 14 are inputted to an intra-software vendor ID reading section 61 serving as a second information reading section and an encrypting section 63.

The software type recognizing section 50 checks whether the software within the WO1 as a medium is of the sell type or the rental type and further checks, in the case of the rental type, a running royalty accounting rate.

The on-medium vendor ID reading section 51 extracts the vendor ID conceived as the first identification data on the system area 1a of the WO1.

The intra-software vendor ID reading section 54 extracts the vendor ID as the second identification data contained in the software within the WO1.

The intra-software vendor ID reading section 61 extracts the vendor ID contained in the received software.

The number-of-approval checking section (flag checking section) 65 checks a state of the number of approvals (flag showing the already-recorded status) within the management area of the WO1.

The ID checking section 53 as a second comparative section compares the on-medium vendor ID with the intra-software vendor ID and, if the two IDs are not identical, notifies the reading section 56 of this effect.

A using quantity checking section 52 serving as a reading quantity recording section subtracts the credit X within the accounting data memory 8 at a rate conforming with the software type on the basis of the signal from the MPEG-2 expansion circuit 11a when the software type is classified as the rental type. Then, when the credit X becomes 0, a read inhibiting section 55 is notified of this effect.

The read inhibiting section 55 inhibits the reading process by the reading section 56 in accordance with this notice.

An approval data checking section 59 checks whether or not the approval data exists in the RAM 15.

An ID checking section 62 as a first comparative section compares the on-medium vendor ID with the intra-software vendor ID and, if the two IDs are not identical, notifies the encrypting section 63 of this effect.

The encrypting section 63 encrypts the software received from the communication system error processing unit 14 by use of the DES 7 and transfers the encrypted software to the reading section 64 in cases where the ID checking section 62 determines that the two vendor IDs are identical, where the approval data checking section 59 determines that the approval data exists in the RAM 15, and where the number-of-approval checking section (flag checking section) 65 determines that the number of approvals is not 0.

A number-of-approval subtracting section 66 conceived as a display/recording section subtracts the number of approvals written to the system area 1a of the WO1 each time the software is written.

A writing section 64 defined as a software writing section writes the software transferred from the encrypting section 63 to the WO1. Further, the writing section 64 writes the software and, at the same time, writes the number of approvals subtracted by the number-of-approval subtracting section 66 to the system area 1a.

The reading section 56 reads the software received from the WO system error processing unit 4 and transfers it to the decrypting section 58 in cases where the ID checking section 53 determines that the two vendor IDs are identical, where the approval data checking section 59 determines that the approval data exists in the RAM 15, and where the read inhibiting section 55 determines that the reading process is not inhibited.

The decrypting section 58 decrypts the software transferred from the reading section 56 by use of the DES 7 and outputs the decrypted software to the demultiplexer 10 (in the case of the video and the audio data). Alternatively, a program executing section 57 is notified of this effect (in the case of the program and the data thereof).

The program executing section 57 executes the program transferred and performs a predetermined arithmetic operation of data processing. A software using quantity is monitored and recorded.

<Operation of Embodiment>

Figure 11:
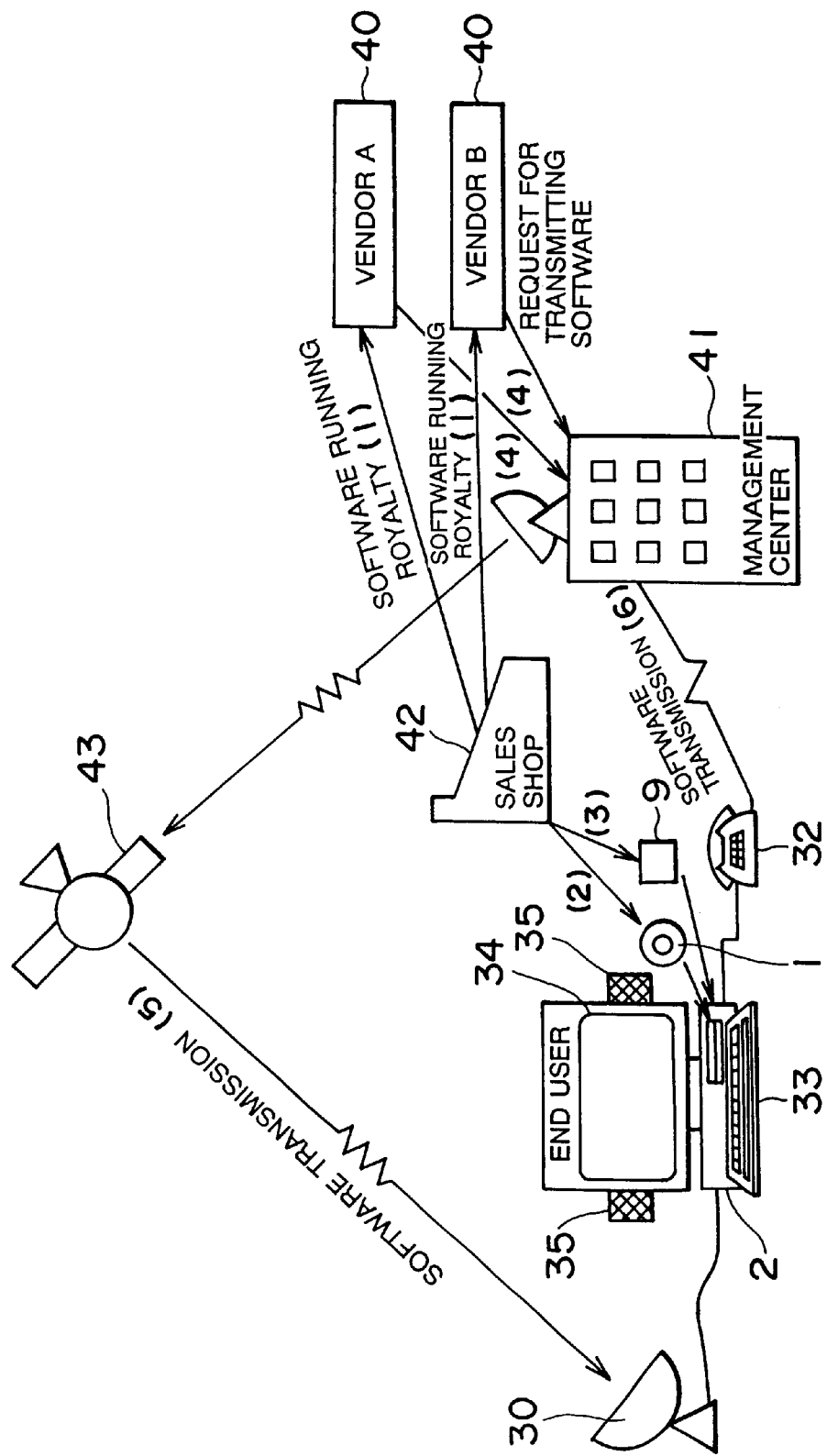
FIG. 11 is an explanatory diagram schematically showing a software distribution in accordance with the first embodiment of the present invention.

Next, a perspective of the software distribution using the software reproducer 2, the WO1 and so on in this embodiment will be discussed with reference to FIG. 11.

Each vendor 40 requests a sales shop 42 for selling the WO1 in which his or her vendor ID is written to the system area 1a thereof. On this occasion, each vendor 40 may write the common vendor ID in some cases. Further, each vendor 40 would set the running royalty in many ways depending on the kind of the software recordable on the WO thereof as the case may be. In such a case, even the same vendor may write a different vendor IDs. The sales shop 42 sells the WO1 to which the vendor ID is written in this way with the software running royalty added to a sale price thereof.

In this instance, when the software running royalty for a single set of software is added to the sales price of the WO1, 1 as a number of approval is set on the management area 1a of the WO1. Contrastingly, when the software running royalty for plural sets of software are added to the sales price of the WO1, the number of approvals on the management area 1a is set corresponding to the number of the sets of software.

Further, the explanation made so far has dealt with the WO1 for recording the sell type software. The vendor 40, however, may vend the WO1 dedicated for storing the rental type software as the case may be. In such a case, a running royalty corresponding to a reproduced quantity of the software is collectible, and, therefore, the running royalty added to the price of the WO1 is set comparatively low.

The software running royalty added to the sales price of the WO1 is paid by the sales shop 42 to the vendor 40 indicated by the vendor ID written to the sold WO1 ((1)).

The end user goes to the sales shop 42 to purchase the WO1 (mail-order selling may also be available) ((2)). Further, at the same time, the end user brings the SD card 9 to the sales shop and has the credit X on the accounting data memory 8 incremented by the sales shop in exchange of paying the prepaid running royalty (rental type software running royalty) (however, the credit X is not required in the case of making use of only the sell type software) ((3)).

Note that the sales shop 42, in this case, analyzes the vendor ID stored in the RAM 15 and a reproducing time. Then, the running royalty paid is divided between each vendor 40 at the rate corresponding to the reproducing time for every vendor 40.

Simultaneously, each vendor 40 entrusts a transmission of the software to a management center 41 ((4)). The management center 41 receiving the entrustment transmits each set of software by means of the satellite broadcasting via a communication satellite 43 ((5)). Note that the transmission of the software through this broadcasting targets unspecified users and therefore is performed according to a predetermined program. The end user receives this satellite broadcasting through the parabolic antenna 30 and takes it into the software reproducer 2.

Further, the management center 41 transmits the entrusted software via the ISDN ((6)). This transmission is based on one-to-one communications and therefore carried out in accordance with a download command given from the user. The end user receives this communication through the MODEM 32 and takes it into the software reproducer 2.

When the software is thus taken into the software reproducer 2, the control CPU 5 compares the vendor ID written to the system area 1a of the WO1 loaded into the WO disk drive 16 with the vendor ID written to the heading of the software received. Only when the two IDs are identical, the software is encrypted by the DES 7 and recorded on the WO1. Accordingly, WO1 other than the WO1 scheduled to be recorded with this software is incapable of recording this software. The user has already paid the software running royalty at the point of time when purchasing this WO1, and hence not only a profit of the vendor but alo a profit of the software rightful claimant is ensured.

Further, the number of approvals stored in the system area 1a of the WO1 is decremented by 1 each time one set of software is recorded. More specifically, one flag indicating the already-recorded status is set in the bit strings showing the number of sets of recordable software. Accordingly, two or more sets of software can not be recorded on the WO1 capable of recording only one set of software. Similarly, the WO1 capable of recording given sets of software is incapable of recording a larger sets of software than it. Hence, not only the profit of the vendor 40 but also the profit of the software rightful claimant is ensured.

Further, when the software recorded, whether the approval data exists or not is checked. This item of approval data is generated depending on checking a password of the user. Accordingly, the software is prevented from being recorded by persons exclusive of the user. Consequently, the software is prevented to some extent from being used by a plurality of persons.

The software stored on the WO1 is sequentially read by the control CPU 5. On this occasion, the vendor ID on the management area 1a is again compared with the vendor ID written to the heading of the software. Then, the decrypting is effected only when the two IDs are identical. Hence, if the software is copied on an irregular WO1 to which the vendor ID of the vendor 40 is not written after the software was recorded once on the regular WO, that software can not be decrypted. Accordingly, the profit of the software rightful claimant is not spoiled.

Further, when the software decrypted, whether the approval data exists or not is checked. This item of approval data is generated depending on the check of the password of the user. Accordingly, the software is prevented from being reproduced by persons exclusive of the user. Consequently, the software is prevented to some extent from being used by the plurality of persons.

In the case of the rental type software, the credit X on the accounting data memory 8 is subtracted in accordance with the running royalty of the software and the reproducing time. This credit, as described above, corresponds to the running royalty of the software. Then, that running royalty is paid from the sales shope 42 to each vendor 40. Hence, not only the profit of the vendor 40 but also the profit of the software rightful claimant is ensured.

If the vendor IDs are not identical with each other when the recording or decrypting is performed, if no approval data exists, if the number of approval is 0 when the recording is performed, and if the credit X becomes 0 when the decrypting is performed, messages showing these effects are displayed on the TV monitor 34. Accordingly, the user is prompted to purchase the regular WO1 or increment the credit X with a payment of the running royalty. These conducts involve the payment of the software running royalty to each vendor 40. Hence, not only the profit of the vendor 40 but also the profit of the software rightful claimant is ensured.

Note that the WO1 is employed as a medium for recording the software in accordance with this embodiment. However, an erasable medium may be supposedly usable as far as it is a writable disk. For example, a magneto-optic (MO) disk can be used in place of the WO1. This MO disk is capable of writing and erasing an infinite number of times, and, therefore, the number of approvals which is permitted to a single piece of disk can be set larger. Further, since the data can be rewritable, the number of approvals can be managed not by the flag as in the case of the WO1 but by the numerical code itself. Because of being rewritable, however, it is required that attributes be set to make the user unable to access the system area to which the number of approvals and the vendor ID are written.

Second Embodiment

A second embodiment is an example whose security check is slightly more simplified than in the first embodiment. That is, in accordance with the second embodiment, Encrypting and decrypting the software are omitted. Further, in the second embodiment, checking the password and approval data is omitted. Additionally, the number of approval which is permitted to the single WO is limited to 1 and managed by a "used flag". Further, in accordance with the second embodiment, the rental type software can not be recorded and reproduced. Namely, management of the used quantity based on the credit does not performed.

Figure 12:
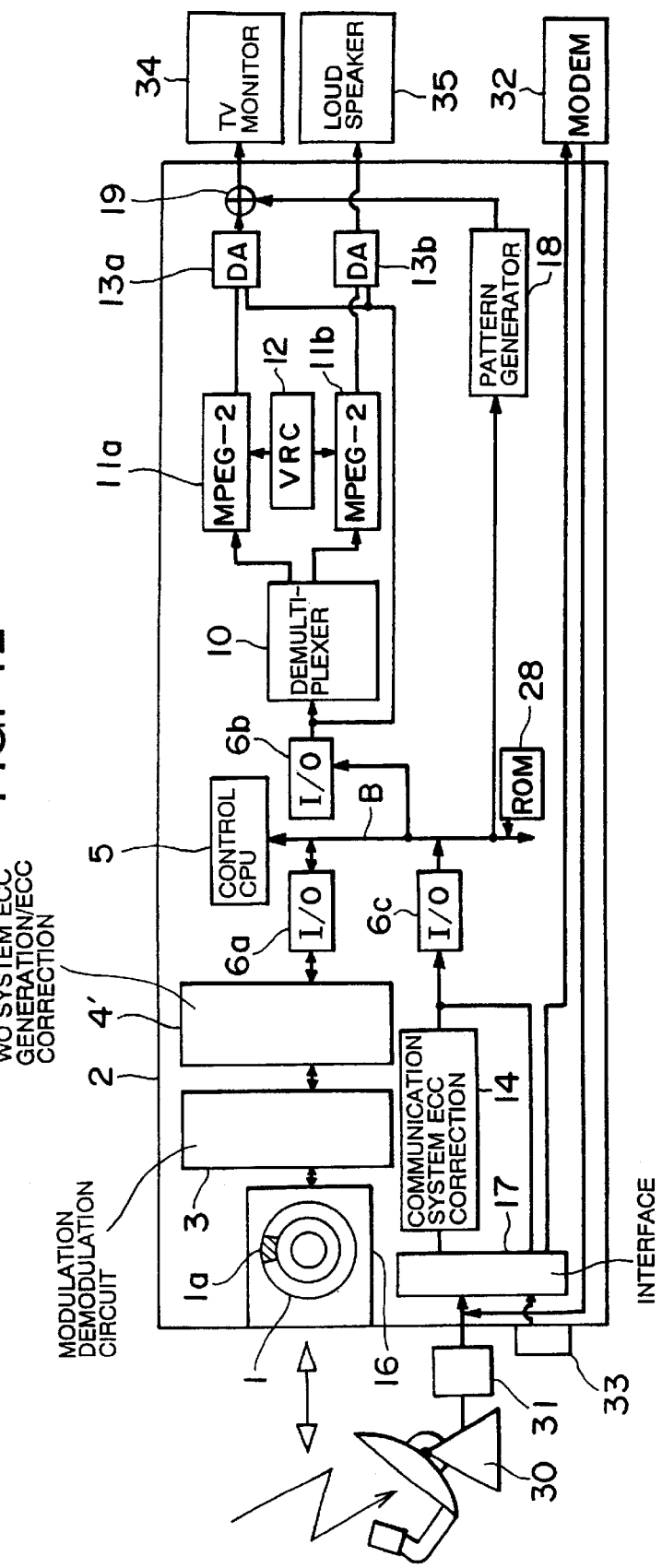
FIG. 12 is a block diagram illustrating a construction of the software reproducing apparatus in a second embodiment of the present invention.

FIG. 12 is a block diagram illustrating a construction of the software reproducer 2 in the second embodiment. As obvious from FIG. 12, in this second embodiment, the DES 7, the accounting data memory unit 8 and the RAM 15 in the first embodiment will be omitted. Further, because of providing no accounting data memory 8, it is meaningless to set the SD circuit 9 detachable from the software reproducer 2. Accordingly, in accordance with the second embodiment, the block constituting the SD circuit 9 in the first embodiment is fixed to the software reproducer 2, and a concept of the SD circuit 9 disappears.

Functions of other constructive blocks in the second embodiment are substantially the same as those in the first embodiment, Hence, those functions are marked with the same numerals as those in the first embodiment, and their explanations will be omitted.

Next, contents of the processes executed by the control CPU 5 in the second embodiment will be described with reference to flowcharts of FIGS. 13 and 14.

Figure 13:
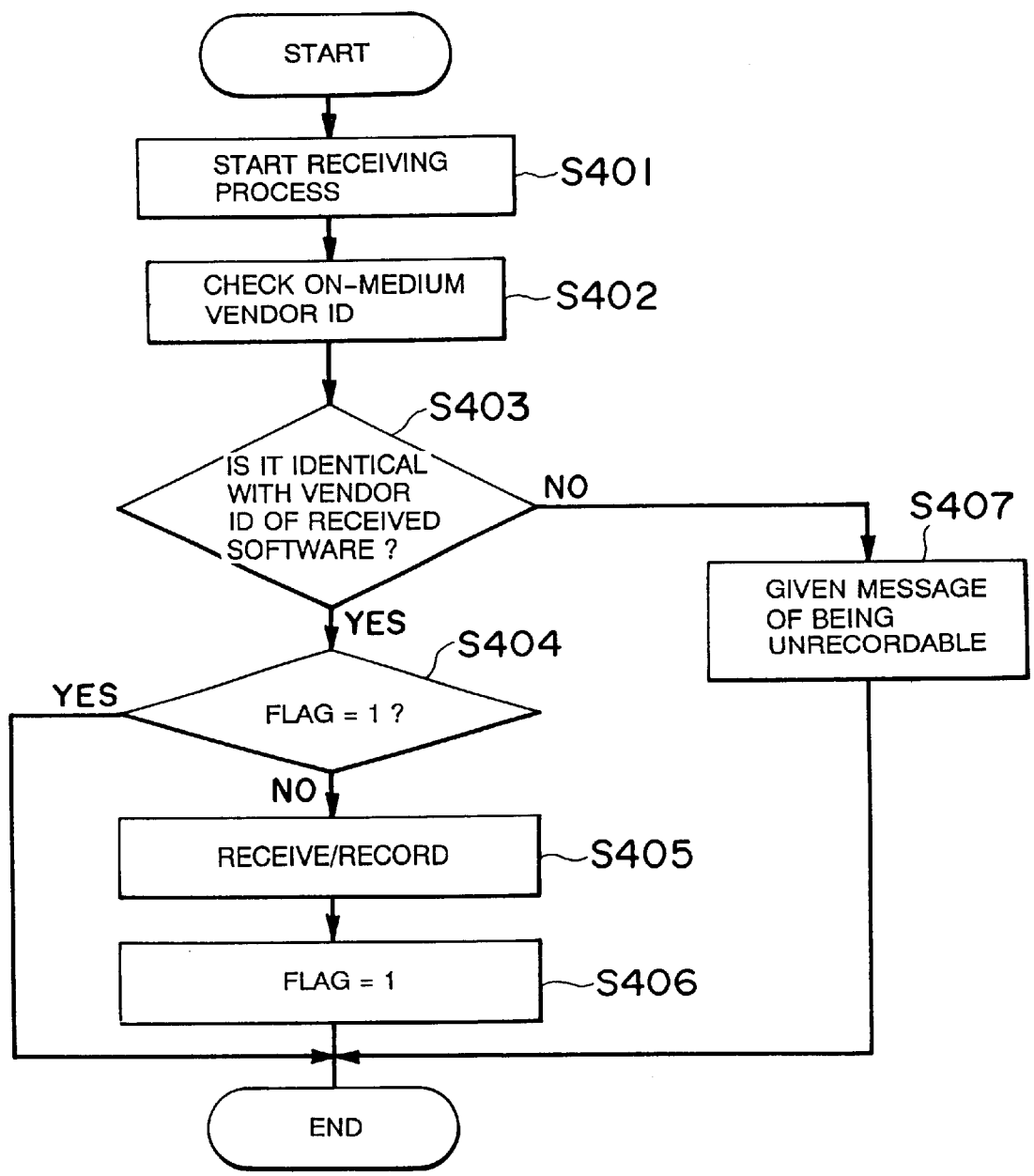
FIG. 13 is a flowchart showing the receiving process executed when the software received.

FIG. 13 is a flowchart showing the processes executed to receive the software. These processes start with the "Record" command inputted from the operation key 33 after the WO1 loaded into the WO disk drive 16 of the software reproducer 2.

In first step S401 after the start, the receiving process is started. That is, a status of the interface unit 17 is set so that the software given from the outside can be received. Then, when the software is transmitted through the satellite broadcasting, there is a wait for the start of the broadcasting thereof, and the processing proceeds to step S402. On the other hand, when the software is transmitted via a telephone line, a command for starting a download of the software is transmitted to a transmitting management center, and thereafter the processing proceeds to step S402.

In step S402, the vendor ID written to the system area 1a of the WO1 is read from the WO disk drive 16 and then checked.

Subsequently, if the vendor ID on this system area 1a is not identical with the vendor ID written to the heading of the software, it is determined that the software is not scheduled to be recorded on the WO1. Accordingly, in this case, the processing proceeds from step S403 to step S407. In step S407, an indication is given to the pattern generator 18 to display a message with the effect that "Unrecordable" on the TV monitor 34. Then, this receiving process is finished as it is.

Whereas if the vendor ID on the system area 1a is identical with the vendor ID written to the heading of the software, it is determined that the software is scheduled to be recorded on the WO1. Hence, in this instance, the processing proceeds from step S403 to step S404.

In step S404, a status of the used flag written to the management area 1a of the WO1 is checked. Then, when the used flag is 1, it is implied that the software has already been recorded on this WO1, and therefore the processing comes to an end as it is. In contrast with this, when the used flag is 0, it is implied that software is not yet recorded, and hence the processing proceeds to step S405.

In this step S405, the software is received through the interface unit 17, and the received software is encrypted by the DES 7. Then, the encrypted software is transmitted to the WO disk drive 16 and recorded on WO1.

When completing the record of the software in step S405, the processing proceeds to step S406. In this step S406, the used flag of the system area 1a of the WO1 is set to 1. Hence, hereinafter, it is impossible to record other software on this WO1. Then, thereafter, this processing is finished.

Figure 14:
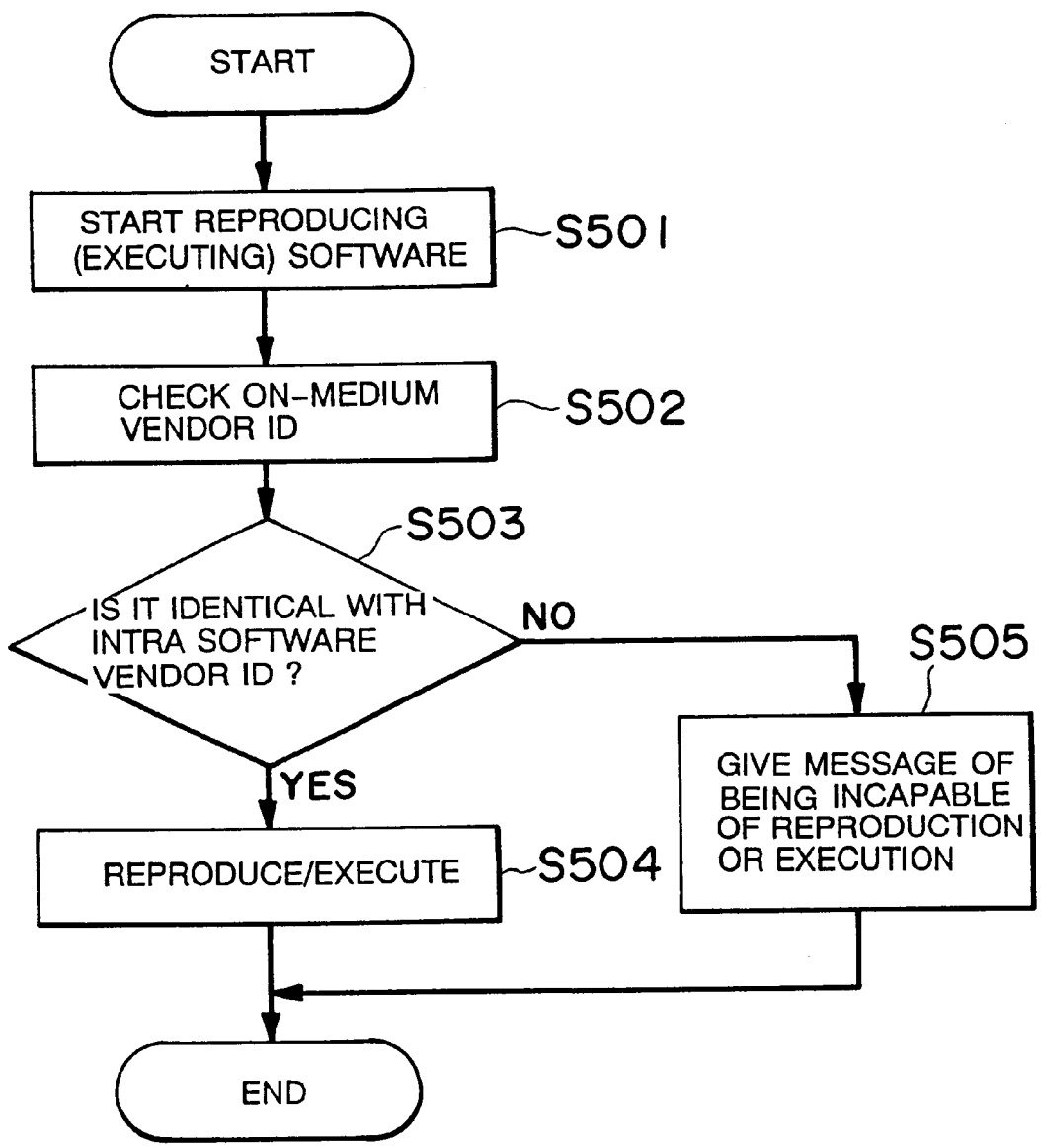
FIG. 14 is a flowchart showing the software reproducing or executing process executed when the software reproduced or executed.

FIG. 14 is a flowchart showing the processes to reproduce the software recorded on the WO1. These processes start with the "Regeneration" command inputted through the operation key 33 after loading the WO1 recorded with the software into the WO disk drive 16 of the software reproducer 2. Then, in first step S501, the reproduction or the execution of the software is started. That is, the software is set in a readable status with the WO disk drive 16 started up.

In subsequent step S502, the vendor ID written in the system area 1a of the WO1 and the vendor ID written to the heading of the software recorded on the WO1 are read and checked.

Then, if the vendor ID written in this system area 1a is not identical with the vendor ID written to the heading of the software, the determination is such that the software is temporarily recorded on the WO1 (WO having the same vendor ID) and thereafter copied on an irregular WO (WO having a different vendor ID or no written vendor ID). Accordingly, in this case, for preventing a loss of profit of the software vendor, the processing proceeds from step S503 to step S505. In step S505, an indication is given to the pattern generator 18 to display the message with the effect that "Unreproducable or inexecutable" on the TV monitor 34. Then, the receiving process is finished as it is.

Whereas if the vendor ID written in the system area 1a is identical with the vendor ID written to the heading of the software, the determination is that the WO1 is a regular WO1 with respect to the relevant software that is, the WO having the same vendor ID, regardless of whether the software recorded thereon is copied or not. Hence, in this instance, the processing proceeds from step S503 to step S504. In step S504, the software is received through the WO system error processing unit 4, and the received software is decrypted by the DES 7. Then, the decrypted software (video, audio) is transmitted to the demultiplexer 10, and reproduced. Further, the decrypted software (program and data thereof) is executed by the control CPU 5, and a variety of arithmetic operations or the data processing is carried out. Thereafter, this processing is finished.

The operations in this embodiment are the same as those in the first embodiment except the security check function deleted for the simplicity as described above. The explanation thereof will be omitted herein.

As discussed above, according to the present invention, the software and the medium can be distributed in separation, and, besides, it is possible to surely collect the selling fee (running royalty) for a copy of the software. Further, the software fixable to a specified medium is limited beforehand, thereby making it possible to surely pay the software running royalty added to the medium back to the rightful claimant of the software which is to be fixed to the medium.

This invention being thus described, it will be obvious that same may be varied in same way. Such variations are not to be regarded as a departure from the spirit and scope of the invention, and all such modifications as would be obvious to one skilled in the art are intended to be included within the scope of the following claims.

What is claimed is:

1. A software processing apparatus comprising:

first information reading means for reading a first identification information stored in an area to which a user is inhibited from accessing on a medium;

second information reading means for reading a second identification information contained in software;

comparing means for comparing the first identification information read by said first information reading means with the second identification information read by said second information reading means; and software writing means for writing the software to the medium only if said comparing means recognizes that the first identification information corresponds to the second identification information.

2. A software processing apparatus according to claim 1, wherein said comparing means recognizes that the first identification information corresponds to the second identification information in case the first identification information coincides with the second identification information.

3. A software processing apparatus according to claim 1, wherein the medium is one to which the software can be written only once.

4. A software processing apparatus according to claim 1, further comprising:

indicating means for indicating, when the software writing means writes the software to the medium, the effect of being written on the medium; and inhibiting means for inhibiting said software writing means from writing the software to the medium in case said indicating means effects the indicating on the medium.

5. A software processing apparatus according to claim 1, further comprising:

recording means for recording information corresponding to a software writable number on the medium; and inhibiting means for inhibiting said software writing means from writing the software to the medium in case the information on the medium recorded by said recording means indicates that the writable number is 0.

6. A software processing apparatus according to claim 1, wherein each of the first identification information and the second identification information comprises plural pieces of identification data.

7. A software processing apparatus comprising:

first information reading means for reading a first identification information stored in an area to which a user is inhibited from accessing on a medium;

second information reading means for reading a second identification information from the medium if software and the second identification information contained in the software are written to the medium;

comparing means for comparing the first identification information read by said first information reading means with the second identification information read by said second information reading means; and software reading means for reading the software from the medium only if said comparing means recognizes that the first identification information corresponds to the second identification information.

8. A software processing apparatus according to claim 7, further comprising reading quantity recording means for recording a reading quantity of the software by said software reading means.

9. A software processing apparatus comprising:

first information reading means for reading a first identification information stored in an area to which a user is inhibited from accessing on a medium;

second reading means for reading a second identification information contained in software;

first comparing means for comparing the first identification information read by first information reading means with the second identification information read by said second information reading means;

software writing means for writing the software and the second identification information to the medium only in case said first comparing means recognizes that the first identification information corresponds to the second identification information;

third information reading means for reading the second identification information from the medium in case the software and the second identification information are written to the medium;

second comparing means for comparing the first identification information read by said first information reading means with the second identification information read by said third information reading means; and software reading means for reading the software from the medium only if said second comparing means recognizes that the first identification information corresponds to the second identification information.

10. A software processing apparatus according to claim 9, wherein said software writing means writes the software to the medium while encrypting the software, and said software reading means read the software from the medium while decrypting the software.

* * * * *